United States Patent [19]
Durst, Jr. et al.

[11] Patent Number: 5,113,518
[45] Date of Patent: May 12, 1992

[54] METHOD AND SYSTEM FOR PREVENTING UNAUTHORIZED USE OF SOFTWARE

[76] Inventors: Robert T. Durst, Jr., 212 Shelton Rd., Monroe, Conn. 06468; Kevin D. Hunter, 440 Allyndale Dr., Stratford, Conn. 06497

[21] Appl. No.: 201,983

[22] Filed: Jun. 3, 1988

[51] Int. Cl.⁵ .................. G06F 12/00; G06F 12/14
[52] U.S. Cl. ................... 395/550; 364/246.6; 364/247; 364/248.1; 364/258; 364/258.2; 364/258.3; 364/270; 364/270.1; 364/286.3; 364/286.4; 364/286.5; 364/286.6
[58] Field of Search ... 364/200 MS File, 900 MS File, 364/300 MS File; 380/4, 5

[56] References Cited

U.S. PATENT DOCUMENTS

| | | | |
|---|---|---|---|
| 4,435,759 | 3/1984 | Baum et al. | 364/200 |
| 4,458,315 | 7/1984 | Uchenick | 364/200 |
| 4,593,353 | 6/1986 | Pickholtz | 364/200 |
| 4,688,169 | 8/1987 | Joshi | 364/200 |
| 4,748,561 | 5/1988 | Brown | 364/300 |
| 4,796,220 | 1/1989 | Wolfe | 364/900 |

FOREIGN PATENT DOCUMENTS 61-250529  5/1988  Japan .
2175111  11/1986  United Kingdom .

Primary Examiner—Thomas C. Lee
Assistant Examiner—Robert B. Harrell
Attorney, Agent, or Firm—Robert H. Whisker; Melvin J. Scolnick; David E. Pitchenik

[57] ABSTRACT

A technique is disclosed for preventing a computer program from being used by a computer system other than a designated system. The values of certain characteristics exhibited by the designated computer system first are stored, and then the values of those same characteristics exhibited by the computer system which is intended to use the computer program are measured and compared to the stored values. If the compared values are substantially the same, the computer program may be executed. However, if they are different, the computer system which was intended to use the program is inhibited from executing that program. The aforementioned characteristics comprise one or more, and preferably at least two, of the following: an identification of the processor included in the computer system, the clock speed of the clock generator included in that system, an identification of the ROM normally provided with the processor, the wait time assigned to the processor for accessing a RAM, the actual rotary speed of a disk drive normally provided with the computer system, the access speed of that disk drive, and the sector interleave value of that disk drive.

17 Claims, 17 Drawing Sheets

METHOD AND SYSTEM FOR PREVENTING UNAUTHORIZED USE OF SOFTWARE

BACKGROUND OF THE INVENTION

This invention relates to a technique for preventing a computer program from being used by an unauthorized computer system and, moreover, to such a technique wherein the values of certain characteristics exhibited by the authorized computer system are used as a basis to determine whether the system on which the program to be executed is authorized.

With the proliferation and popularity of personal computer systems, both for professional, or office use and for personal, or home use, the availability of various types of software packages is practically overwhelming. Such software packages usually are provided as machine-readable information recorded on a so-called floppy disk. The programs represented by such software packages are run simply by loading the floppy disk into a suitable disk drive and then "installing" the program into the computer system, as by writing the software so as to be resident in the computer random access memory (RAM). When the user is provided with a computer system having a fixed disk drive (also referred to as a "hard" or "Winchester" disk drive), the computer program usually is transferred from the floppy disk to the fixed disk for subsequent use by the computer system.

In the absence of any so-called "copy" protection, it is appreciated that an individual who purchases the software package from an authorized source, such as a computer store, may make several copies of that software package and each copy may be used on a separate computer system. Although back-up copies of software packages normally are desired, it is highly undesirable to tolerate numerous unauthorized and, thus, "pirated" copies. Such piracy deprives the software supplier of fees to which he is otherwise entitled. Each pirated copy of a software package, that is, each unauthorized copy that is made, deprives the software supplier of a legitimate sale of that package.

Various techniques have been proposed to solve or at least minimize this significant problem of software piracy. A common, yet simple attempt has been by way of legal warning. Typically, software is not "sold" per se to the end user. Rather, the user merely purchases a license which permits him to use the software package subject to certain constraints, one of which is his agreement not to distribute copies to others who have not purchased a similar license. These threats of legal retribution have been largely ignored.

Other attempts at copy protection have relied upon various inherent characteristics of both the hardware (i.e. characteristics of the computer system) and software (i.e. the instructions to manipulate data). For example, software packages have been designed such that, after one copy has been made, certain key features, or modules, of the package are obliterated to the extent that further copying is inhibited. While this prevents the running of most straightforward "copy" operations, various skilled technicians have developed unconventional programs which reproduce virtually each and every bit that is recorded in the original software package. These programs do not require the manipulation of any data included in the software package and, thus, the aforementioned key features, or modules, are not obliterated.

Another copy protection technique incorporates some characteristic in the purchased software package which can be detected by a standard floppy disk drive but which cannot be reproduced by that drive. However, the usual mechanical tolerances found in floppy disk drives minimize the efficacy of this technique. Indeed, the operational characteristics of a floppy disk drive may be such that the aforementioned characteristic cannot even be detected and, thus, the software package cannot be executed even though it, or a copy, was purchased legitimately.

Yet another copy protection technique has been designed primarily for use with software packages that have been transferred to a fixed disk. Here, the original floppy disk which contains that package must be loaded into the computer system before the software that had been recorded on the fixed disk can be read therefrom. That is, the original floppy disk functions as a "key" that must be loaded into the system in order to "unlock" the software package from the fixed disk.

Various other copy prevention techniques that have been developed include the following:

Exploiting the fact that, in most "original" software packages, the sectors recorded on the floppy disk normally are in general alignment. However, a particular characteristic associated with this alignment, although detectable on the original disk, normally is not carried over when that disk is copied. Execution of the software package thus can be made dependent upon detecting this alignment-associated characteristic.

Providing with the software package recorded on the original floppy disk a so-called "boot-strap" program which, when executed, indicates that no further data is recorded (i. e. it indicates that the rest of the disk is empty). When the original disk is copied, the boot-strap program also is copied but, in accordance with typical copying routines, the computer system is deceived into recognizing that no other data is available to be copied.

A particular sector on the original disk is destroyed, as by a laser, during manufacture. Upon invocation, the program in question verifies that that particular sector of the disk is, in fact, unwritable before continuing execution. The corresponding sector of a copied disk will, in general, be writable, and thus a copy can be distinguished from the original.

As a practical matter, it is not the act of copying a software package per se that is most troublesome to software suppliers. Rather, it is the *use* of the copies on various additional computer systems without paying for the right to use those copies. If each computer system is provided with a "secret" serial number, an ideal technique for avoiding the proliferation of unauthorized copies of software packages could be achieved simply by preventing that software from being executed, manipulated or copied until the secret serial number is recorded in the software itself. Subsequent execution of the software package, that is, execution of the applications software program, would be enabled only if the recorded serial number matches the "secret" number of the computer system in which the software was invoked. Unfortunately, computer systems are not provided with such secret serial numbers.

An analogous difficulty arises in a network of computers (or data processing devices) wherein only one or a select few of the networked computers may be authorized to execute a particular software package. As is known to those of ordinary skill in the art, a software program that is stored on a "hard" disk (i.e. a Winchester disk) of an appropriate computer in the network may be configured to be accessed by any computer in that network and downloaded so as to be resident in the RAM of that computer. If a particular software program stored on a network hard disk is not be authorized for use by all computers in that network, some means should be provided to permit only authorized users to access and run that program, even though it is physically available to all.

OBJECTS OF THE INVENTION

Therefore, it is an object of the present invention to provide a technique of preventing a computer program from being used by an unauthorized computer system which overcomes the aforementioned difficulties and disadvantages associated with the prior art.

It is also an object of this invention to permit a software program to be run by only authorized computer system(s), or data processing device(s) included in a network.

Another object of this invention is to provide a technique of identifying a computer system.

A further object of this invention is to identify a computer system as a particular authorized computer system to permit a software program to be run by that system or data processing device.

Various other objects, advantages and features of the present invention will become readily apparent from the ensuing detailed description, and the novel features will be particularly pointed out in the appended claims.

SUMMARY OF THE INVENTION

In accordance with this invention, a technique is provided wherein the "signature" of one or more authorized computer systems (or other data processing devices) is determined and stored, and then, prior to executing a particular program intended to be installed in a computer system, the stored signature(s) is compared to the signature of the computer system intended to be used. If there is a "match" between the signatures, the computer program is enabled to be executed, or run.

As used herein, the "signature" of a computer system is intended to refer to the values of certain characteristics exhibited by that system. Examples of such characteristics which comprise a "signature" (also referred to as parametric data or parametric characteristics) include an identification of the computer system processor, the clock speed of the computer system clock generator, an identification of the computer system ROM, the wait time, or wait cycles, assigned to the computer system processor for accessing a RAM, the rotary speed of a computer system disk drive, the access speed of that disk drive and the sector interleave value of that disk drive. The invention is not intended to be limited solely to these examples; and other characteristics which can be used to distinguish one computer system from another are contemplated. In general, such characteristics may be categorized as (a) parameters which are designed specifically into individual computer systems (such as the type of processor, the version of operating software, etc.), and (b) parameters which are defined by particular tolerances in the manufacture of the computer system and its peripherals (e.g. the specific rotating speed of a disk drive, which may vary within a range of design tolerances, etc.).

The above described characteristics will sometime hereinafter be referred to as "inherent, system independent characteristics". These characteristics are "inherent" in the sense that they are determined by the design and/or manufacturer of a system, and are not merely arbitrary added features, such as serial numbers or code words, nor easily altered characteristics such as peripheral configurations or amounts of memory provided. The characteristics are "system independent" in that they may be determined for any system with which the software to be protected is compatible.

As a feature of the present invention, the computer system processor may be identified by the size of the processor data bus (e.g. 8-bits or 16-bits), and also by the family, group and member of the processor itself. For example, if the processor is manufactured by Intel Corporation, it might be included in the so-called 8086 family of processors. This family includes the groups 8088, 80186/80188, 80286 and 80386. The particular member of each group is determined as a function of the particular instructions which may be carried out by the processor (for example, a Model 80286 processor might not be able to carry out certain instructions that are executed by the Model 80386 processor) and the data bus size (for example, all instructions carried out by the Model 8086 processor also are carried out by the Model 8088 processor, but the latter operates with an 8-bit data bus whereas the Model 8086 operates with a 16-bit data bus).

Another characteristic used to identify the signature of a computer system includes the clock speed of the usual clock generator included in the computer system. Clock speed may be determined by a variety of means, one of which is the measurement of the length of time needed to shift the contents of a processor register, such as the contents of an accumulator. Depending upon the specified number of clock cycles needed for the processor to shift the contents of the register through one bit position, the actual clock period and, thus, the clock speed (or repetition rate) may be determined.

As a still further feature of this invention, the wait time, or number of wait states, associated with the accessing of RAM is determined. Typically, the operating speed of RAM, and particularly that of a dynamic, or "D-RAM", is significantly slower than the processor operating speed. To provide compatibility therebetween, it is typical to introduce so-called "wait states", or idle cycles, into a memory access operation so that the processor can "wait" for the RAM to react accordingly. Since such wait states frequently are not needed when accessing a ROM, the wait time and, thus, the number of wait states, may be determined by comparing the time for the processor to access a particular location in the ROM to the time for the processor to access a similar location in the RAM. Once the difference in such access times is determined, the number of wait states may be computed merely by dividing this time differential by the period of the processor clock generator.

As yet another feature of this invention, actual rotary speed of the disk drive that normally is included in the computer system may be carried out simply by reading a predetermined sector on the disk M successive times, and then dividing the length of time needed to complete such M read operations by the factor M.

As a still further feature of this invention, the access speed of the disk drive read/write head may be determined by measuring the time needed for the head to move forward and backward across a predetermined number of tracks. To avoid time delays attributed to head settling and the like, an adjustable delay may be imparted into the overall time-measuring operation. Furthermore, if a predetermined sector is read prior to and then following the movement of the head, the overall time required to carry out this operation during one complete disk rotation should be equal to the time to move the heads forward and backward across the tracks, plus the imparted delay, plus the time remaining for the disk to complete its rotation and return to the predetermined sector. The only unknown quantity in the preceding time measurements is the time remaining for the disk to complete its rotation. However, by incrementally increasing the imparted delay until the overall measured time now is equal to the time required for the disk to make two complete rotations, the conclusion is reached that the time for the head to move forward and backward across the tracks plus the imparted delay is equal to one disk rotation. Hence, the time for the head to move across the tracks is equal to the difference between the disk rotation period and the imparted delay; and when this difference is divided by twice the number of tracks that the head crosses, the resultant quotient is equal to the time for the head to access a single track.

As a still further feature of this invention, the sector interleave value, which is a measure of the number of physical sectors which separate logically sequential sectors on a track of the disk drive, is determined by reading the first sector and then reading the Mth sector on a track, and sensing when the Mth sector is read immediately after the disk has completed one full rotation. Since the Mth sector follows the first sector, the interleave value is a function of M.

It is contemplated that the present invention be included in an applications software package, such as software in the form of a floppy disk or other so-called mass memory device (e. g. magnetic tape, a ROM cartridge, a CD ROM, or the like). Accordingly, an applications software package would include the present invention in the form of a routine for conditioning the software package to be executed only by an authorized computer system. The routine includes a set-up procedure to store in the software the signature of the computer system which first is used to execute the software. As a feature of this aspect of the invention, if a signature already has been stored in the software, the set-up procedure is terminated. Thereafter, whenever the software is to be executed, the signature of the computer system intended to run that software is compared to the stored signature to enable utilization of the applications software if the signatures match.

As another aspect, the present invention is integrated into the applications software program such that, following initialization of that program wherein the signature of the computer system is stored in software, all subsequent attempts to utilize the applications software are preceded by a comparison between the stored signature and the signature obtained from the computer system on which the program is intended to be used.

It is expected that certain components of the computer system which uses the applications software program incorporating the present invention may be replaced. For example, the disk drive may be replaced or upgraded, the computer system processor may be upgraded or supplemented with a co-processor, and the like. To accommodate such component replacements (also known simply as hardware changes), the invention contemplates a re-recording, or re-storing in the applications software, of those parametric characteristics of the signature of the computer system which have been changed, provided however, that the remaining unchanged parametric characteristics of the computer system match those which are stored. In this regard, if the user is authorized, for example if the applications software has stored therein a cryptographic key (e. g. a "password") which must properly be entered by the user, then the signature which is stored in that software may be updated (or re-recorded) to accommodate hardware changes. Alternatively, a re-record enable signal may be transmitted from a central authorizing source to the computer system via a telephone link once the authorization for signature re-recording is confirmed.

The present invention may be used in a network of computer systems such that an applications software program may be run only by n of those computer systems (wherein n is less than the total number of computer systems in the network but is selected to be 1, 2, 3, ... or any other integer). Thus, the signatures of the n authorized computer systems are stored with the applications software, and the signature of any computer system in the network that attempts to run that software first is measured and compared to the stored signatures for a match. If the compared signatures match, the computer system is enabled to run the software.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Computer System

Figure 1:
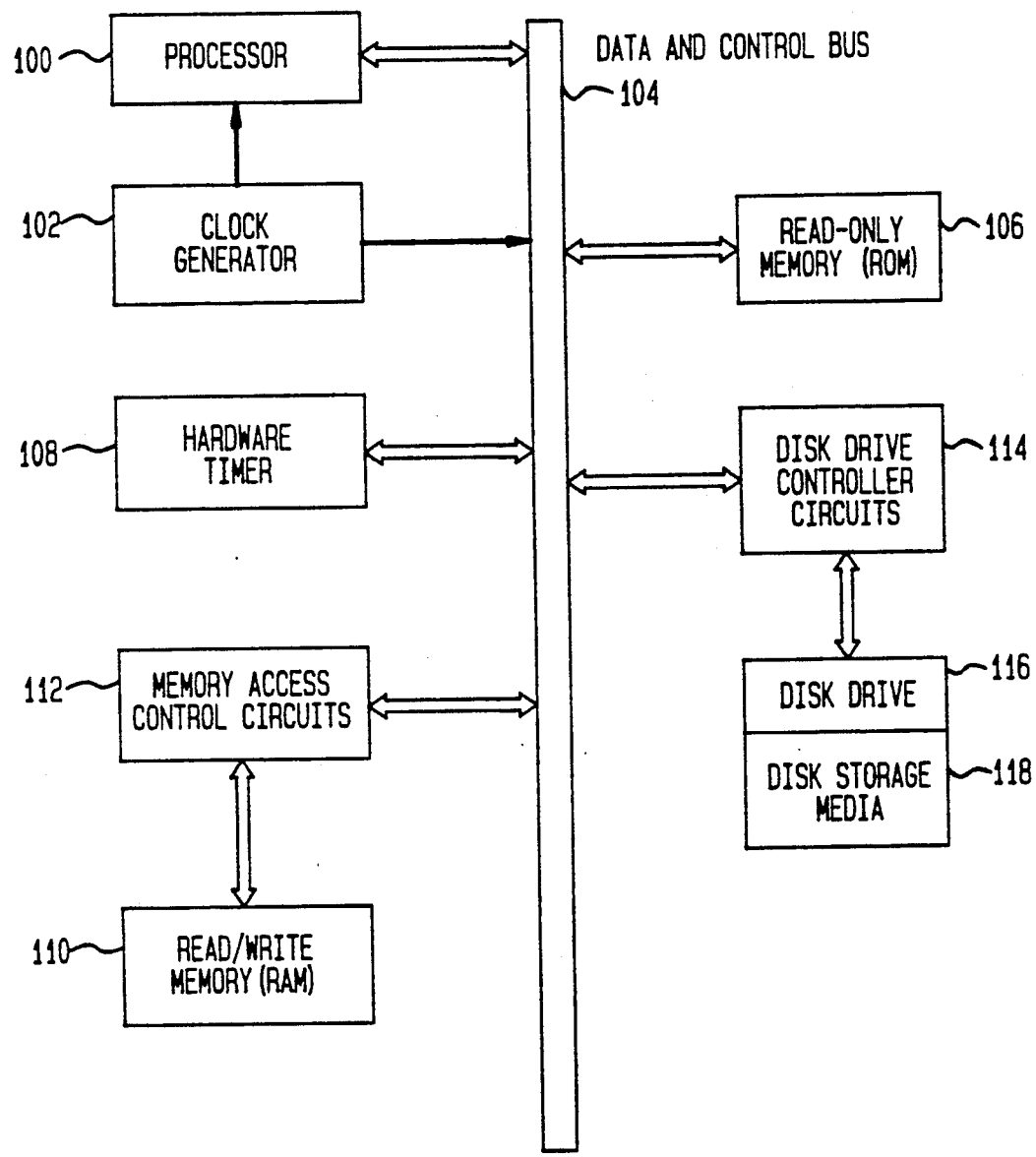
FIG. 1 is a block diagram of a typical computer system configuration with which the present invention finds ready application.

Referring now to the drawings, and in particular to FIG. 1, there is illustrated a block diagram of a typical configuration of a data processing system, such as a computer system with which the present invention may be used. As used herein, the expression data processing system is intended to mean a digital computer system, a video game playing device, or any other system that uses or operates with software. As shown, this configuration includes a processor 100, a random access memory (RAM) 110, a read only memory (ROM) 106, and a disk drive 116. The illustrated elements are coupled, either directly or indirectly, to a data and control bus 104 by which data and control signals are transmitted from one element to another, generally under the control of processor 100.

Processor 100 is conventional and, as examples, may be an Intel microprocessor, Model 8086, 8088, 80186, 80188, 80286 or 80386, the most common microprocessors now used by, for example, IBM microcomputers. Alternatively, processor 100 may be a microprocessor manufactured by Motorola, such as Model 68000, 68008, 68010 or 68020. Other processors provided by other manufacturers may be used, if desired, and in order to simplify the present discussion, it is assumed that processor 100 comprises an Intel processor of the so-called 8086 family.

It is appreciated that, as microprocessors improve in capabilities, speed and capacities, the manufacturer generally takes steps to make certain that an improved microprocessor nevertheless can carry out all of the functions achieved by its predecessors. However, the various models of microprocessors included in a family, such as the Model 8086 family, may differ not only to the extent that certain instructions carried out by newer models cannot be executed by older ones, but also with respect to bus size. For example, the data bus used with the microprocessor may be either an 8-bit bus or a 16-bit bus. If data and control bus 104 comprises an 8-bit bus, then the microprocessor must carry out two separate operations to transfer a 16 bit quantity to or from bus 104. Of course, a microprocessor which operates with a 16-bit bus carries out a 16-bit transfer over that bus in only one operation.

As will be described below, processor 100 may be identified as a function of its family membership as well as its external bus size. The identification of the processor is useful in ascertaining the "signature" of the computer system illustrated in FIG. 1. As mentioned above, and as will be apparent from the discussion below, the signature of the computer system serves to identify that computer system and to distinguish it from others, even though such other computer systems may include the same or similar peripheral devices. The present invention proceeds on the basis that, once the signature of a particular computer system is identified, an applications software program which includes the present invention will be executed only on a computer system having that very same signature. Moreover, it is contemplated that the signature of the computer system which first initializes the software will be stored in that software. Hence, if the software is copied, the signature likewise is copied. Consequently, if attempts are made to use the copied software on any other computer system, the fact that such other computer system exhibits a different signature prevents such usage.

For the purpose of the present description, it is assumed that the software which is used to carry out the present invention, and the software applications program which may incorporate the present invention, are embodied in the form of a floppy disk. However, other so-called "mass storage devices" may be used, such as magnetic tape, a ROM cartridge, a CD ROM, or the like. However, for convenience, the following description is directed to software embodied in the form of a floppy disk, although the specification should be interpreted to include such other mass storage devices.

A clock generator 102 is coupled to processor 100 and also to data and control bus 104. As is conventional, clock generator 102 functions to synchronize the operations of processor 100 with other peripheral devices coupled to bus 104.

Read only memory (ROM) 106 is conventional and, as is understood by those of ordinary skill in the art, stores basic programs and data which are used by processor 100 to carry out various operations. Data is read from ROM 106 and supplied to processor 100 by way of bus 104.

As designers and manufacturers of microprocessors and computer systems improve the operations and capabilities thereof, the particular programs and data included in the ROM normally are updated. However, such updated ROMs generally are not distributed to previous purchasers for substitution or upgrading of their computer systems. Hence, it is highly likely that two outwardly identical computer systems may have different versions of programs stored in ROM 106. The identification of the ROM thus may be an indication of its particular version. As will be described below, ROM identification, or an identification of the version of the ROM, provides yet another component or characteristic of the computer system signature.

Random access memory (RAM) 110 is coupled to bus 104 by a conventional memory access control 112. In order to provide relatively low cost RAM, it has been conventional to construct memory 112 as a dynamic RAM chip, or D-RAM. Such D-RAM chips frequently operate at much slower access speeds than ROM 106 and are much slower than processor 100. Thus, to provide compatibility between the processor and the RAM, that is, to match the higher speed processor with the slower speed RAM, instructions which call for writing data to RAM 110 or which call for reading data from the RAM (referred to herein generally as "accessing" the RAM), usually require the processor to "wait" until the RAM is ready to respond to an access operation. As an example, a delay determined by a number of clock cycles, for example, four cycles of clock generator 102, may be imparted to processor 100 to provide for such speed matching. This delay is referred to as a wait delay; and the number of clock cycles which produce this delay determine the number of "wait states" which are assigned to the processor for memory access. The number of wait states, or the amount of wait time, constitutes yet another component, or characteristic, of the computer system signature. Memory access control circuit 112 may be the device which introduces such wait states.

Disk drive 116 may take the form of a floppy disk drive or a fixed disk drive, the latter also being referred to as a "hard" or "Winchester" disk drive. Disk drive 116 includes one or more read/write heads for recording and reproducing (i. e. writing and reading) data on a magnetic disk 118. For a floppy disk drive, a single magnetic disk may be provided, and one or both surfaces of this disk may be used to store data. If disk drive 116 comprises a hard disk drive, several individual platters may be provided therewith; and each surface of each platter may be scanned by one or more read/write heads for reading or writing data thereon. A disk drive controller 114, which is a conventional device, controls the operation of disk drive 116 in response to data read/write commands from processor 100 and is coupled to bus 104 to permit data to be communicated between disk media 118 and the bus.

Disk (or disks) 118 of disk drive 116 is rotated at a nominal speed. However, the actual rotary speed of the disk may differ somewhat, within preestablished tolerances, of this nominal speed. A measure of the actual rotary speed forms yet another component, component, or characteristic, of the computer system signature.

Likewise, the stepping speed of the disk drive, that is, the rate at which the read/write head (or heads) moves from one track to another varies, within preset tolerances, from a nominal value. A measure of the actual stepping speed of the disk drive provides a still further component of the computer system signature. It is appreciated, therefore, that two disk drives which otherwise appear to be identical nevertheless exhibit measurably different rotary speeds and stepping speeds which are useful in determining system signature.

FIG. 1 also illustrates a hardware timer 108 which, generally, is a timing circuit separate and apart from clock generator 102. Hardware timer 108 is used usually to generate time-of-day information, memory refresh time, and the like. As described below, the hardware timer is used by the present invention to measure the amount of time which has elapsed between various instructions or operations used in determining the signature of the computer system.

As will also be described below, it is typical that the data written in respective tracks on disk media 118 is recorded in interleaved sectors. That is, sector 2 might not follow sector 1 directly. Rather, one or more other sectors may separate sectors 1 and 2, whereupon these sectors exhibit an interleave value determined by the number of such interspersed sectors. The reason for such sector interleaving will be discussed below. The sector interleave value may form yet another component of the computer system signature.

The various elements illustrated in FIG. 1 are conventional and operate in a manner known to those of ordinary skill in the art. Thus, in the interest of brevity, further description of these elements, their interaction and their operation is not provided.

Figure 2:
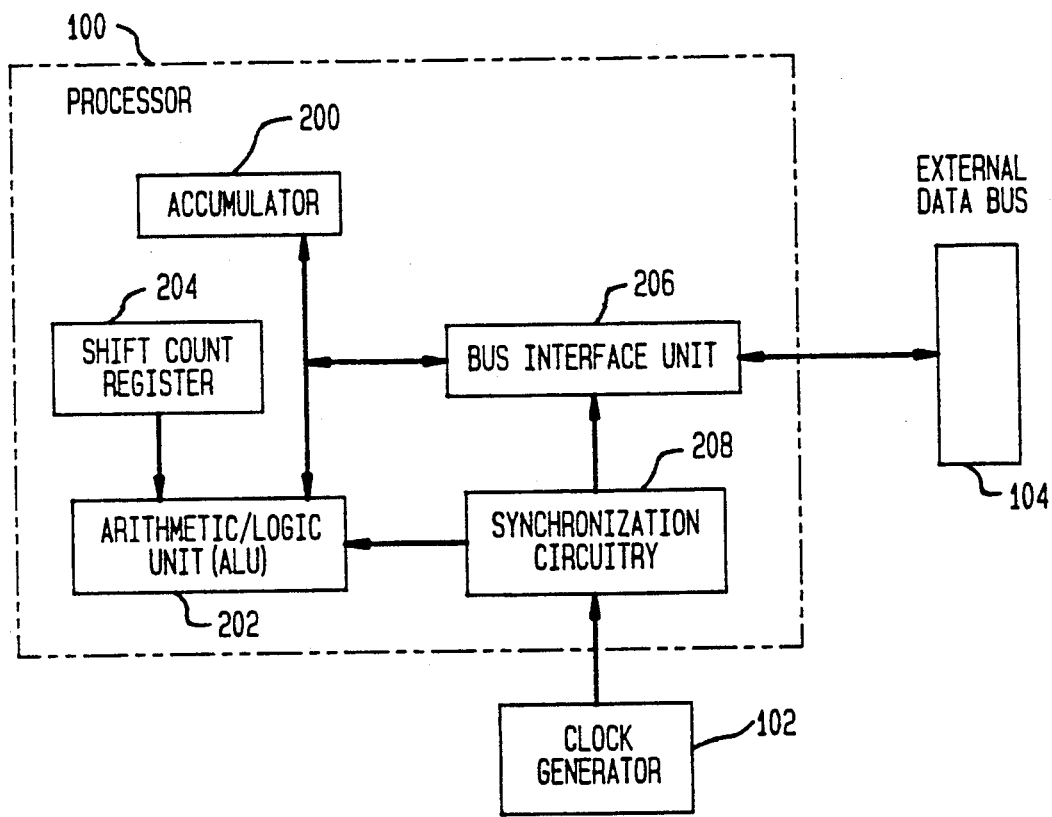
FIG. 2 is a block diagram of a typical processor provided in the computer system.

FIG. 2 is a block diagram of a typical construction of processor 100 and more particularly, is representative of the functional elements of the processor. As mentioned above, in the interest of simplification, processor 100 is described herein as being formed from the Intel Model 8086 family. However, it will be appreciated that the processor may be any other conventional microprocessor whose functional construction is comprised generally of the blocks illustrated in FIG. 2. Hence, although the following description is directed primarily to the Intel Model 8086 family, it is equally applicable to other microprocessor constructions.

Processor 100 is comprised of a multi-bit register, or accumulator 200, an arithmetic logic unit ALU 202, a shift count register 204, a bus interface unit 206 and a synchronization circuit 208. Although the processor also may be formed of other functional elements, for the purpose of the present description only those elements which are relevant to the present invention are shown and explained herein. Accumulator 200 is capable of storing an n-bit character and, under the control of ALU 202, may shift the bits of that character through a number of successive stages. This bit-shifting may be carried out in the "left" or "right" direction, depending upon the function and operation to be executed. For example, arithmetical multiplication may be implemented by shifting the n-bit character through a desired number of bit stages in the "left" direction. The number and direction of such bit shifting is controlled by ALU 202.

ALU 202 is a conventional module and operates to carry out the usual arithmetic functions, namely, addition, subtraction, multiplication and division. The ALU is coupled to shift count register 204 which supplies a shift count that determines the number of successive bit stages through which the n-bit contents of accumulator 200 are shifted. For example, a shift count of one operates to cause the contents of accumulator 200 to be shifted through one stage. Likewise, a shift count of two causes the contents of the accumulator to be shifted through two successive stages. Thus, it is seen that a shift count of A causes the contents of the accumulator to be shifted through A successive stages and a shift count of B results in the shifting of the contents of the accumulator through B successive stages.

Accumulator 200 and ALU 202 are coupled to bus interface unit 206 which, in turn, is coupled to data bus 104. The bus interface unit functions as a communication channel through which information between processor 100 and data bus 104 is shifted. The bus interface unit 206 also serves to "match" the internal bus of processor 100 to the external bus 104. For example, if accumulator 200 is formed as a 16-bit register but data bus 104 is formed as an 8-bit data bus, bus interface unit 206 transfers two successive 8-bit characters between the accumulator and the external data bus. That is, two successive exchange operations by interface unit 206 are needed to exchange 16-bit data to or from accumulator 200. However, if data bus 104 is formed as a 16-bit data bus, then only one data exchange operation is needed by the interface unit to exchange 16-bit data to or from the accumulator.

Synchronization circuit 208 is coupled to ALU 202 and to interface unit 206 to synchronize the operations of these respective units. The synchronization circuit is coupled to clock generator 102, as illustrated, and responds to the clock pulses received from the clock generator to control the operations of ALU 202 and interface unit 206 in properly timed relation. Hence, the speed of operation of processor 100, as determined by synchronization circuit 208, is determined by the clock speed (or repetition rate) of the clock generator. Consequently, the rate at which instructions are executed, arithmetic operations are carried out, etc., all are regulated by the repetition rate of the clock signal produced by clock generator 102.

The various operations carried out by the elements comprising processor 100 are conventional, as known to those of ordinary skill in the art. Hence, further detailed description of such conventional operations is not provided. However, the particular operations carried out by these elements to implement the present invention now will be described in conjunction with the flow charts illustrated herein.

Processor Identification

Figure 3:
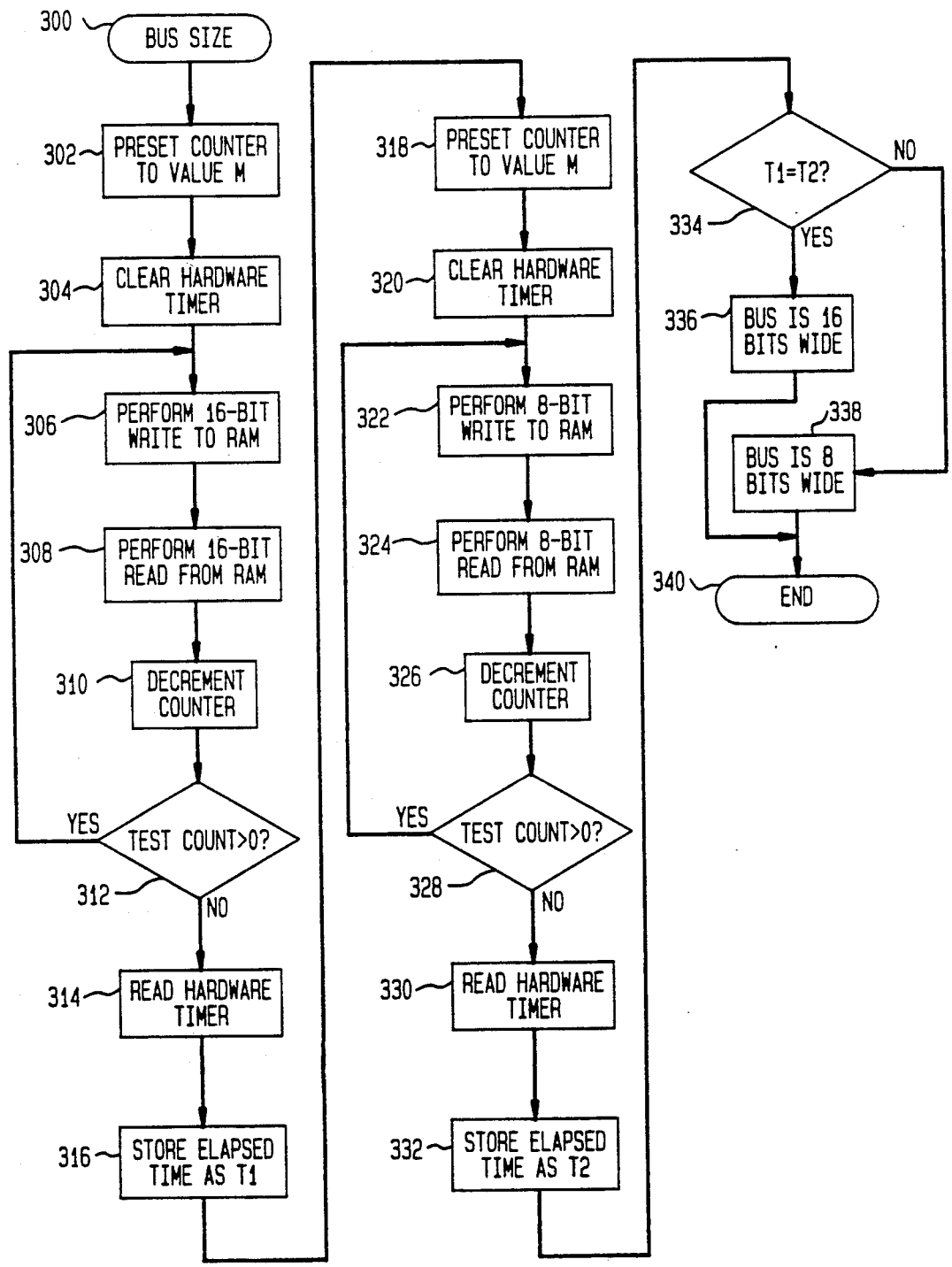
FIG. 3 is a flow chart representing the manner in which the size of the processor bus is determined.

As mentioned above, the present invention limits execution of an applications software program to the particular computer system whose signature corresponds to the signature of an authorized computer system. It is expected that the applications software program is stored on a mass memory device, such as a floppy disk. Also stored on this floppy disk is an authorization program which, typically, carries out the following functions: The authorization program measures and stores the signature of the computer system on which it first is installed. Thereafter, whenever the applications program is to be used, the authorization program first measures the signature of the computer system which is intended to use the applications software program, compares the measured signature to the stored signature and then enables the applications software program to be "run" only if the measured and stored signatures are substantially the same. One of the components, or characteristics, of the signature is the identification of the processor of the computer system. For example, and with reference to the Model 8086 family of Intel processors, the particular processor of the computer system is identified as a Model 8086, 8088, 80186, 80188, 80286 or 80386 processor. The processor may be identified as a function of its bus size, that is, whether its external bus is an 8-bit bus or a 16-bit bus, and also as a function of the particular instructions which it is capable of executing. For example, Models 8086 and 8088 both execute substantially the very same instructions, but the Model 8086 uses a 16-bit external data bus whereas the Model 8088 uses an 8-bit bus. To distinguish therebetween, the present invention includes a bus size computation subroutine, the flow chart of which is illustrated in FIG. 3.

The bus size computation subroutine, which is included in the signature routine, initially presets a counter to any arbitrary value M, as represented by instruction 302. It is understood that the preset counter is not shift count register 204 (FIG. 2). Rather, it is one of the several other counters or registers normally included in processor 100. Then, the subroutine advances to instruction 304 whereat a hardware timer, such as hardware timer 108 (FIG. 1) is cleared. As will be described, the hardware timer is used to determine the elapsed time to carry out the various instructions represented in FIG. 3. If desired, the hardware timer need merely be preset to some desired value, or "initialized".

After presetting the counter and clearing the hardware timer, a 16-bit write operation is carried out, as represented by instruction 306. That is, processor 100 writes a 16-bit character to RAM 110. The particular addressable location into which this character is written is irrelevant to the subroutine illustrated in FIG. 3, as is the value of the character. Thereafter, a 16-bit character is read from RAM 110, as represented by instruction 308. Here too, the particular address in the RAM from which the character is read is not pertinent; and, if desired, the very same RAM address may be used for both the data write and data read operations.

After the 16-bit character is written to RAM and read from RAM the counter which had been preset now is decremented by a value of 1, as represented by instruction 310. A test then is made to determine if the decremented count is greater than 0, as represented by inquiry 312. If this inquiry is answered in the affirmative, that is, if the counter has not yet been decremented to a count of 0, the operations represented by instructions 306, 308 and 310 are repeated. The subroutine cycles through the loop formed by these instructions until inquiry 312 is answered in the negative Thus, after a 16-bit character has been exchanged between the processor and RAM M times, the subroutine advances to instruction 314 whereat the present condition of the hardware timer is read. Instruction 314 thus determines the time duration needed for such M 16-bit exchanges. The elapsed time $T_1$ represented by the hardware timer is stored, as represented by instruction 316.

After elapsed time $T_1$ is stored, the subroutine advances to preset the counter counter once again to the value M, as represented by instruction 318. The hardware timer then is cleared, as at 320, and then the processor writes an 8-bit character to the RAM and reads an 8-bit character from the RAM, as indicated by instructions 322 and 324. After this exchange of an 8-bit character between the processor and the RAM, the counter is decremented, as at 326. Then, the subroutine advances to inquiry 328 to determine if the count of the counter has been reduced to a count of 0. If the count of this counter is greater than 0, inquiry 328 is answered in the affirmative and instructions 322-326 are repeated. Hence, the subroutine cycles through the loop formed of instructions 322, 324 and 326 until inquiry 328 is answered in the negative. At that time, the count of the counter has been decrement to a count of 0 and the hardware timer is read once again, as called for by instruction 330. The elapsed time $T_2$ represented by this hardware timer as the time measured for carrying out the 8-bit data exchanges M times is stored, as represented by instruction 332.

The subroutine then advances to inquiry 334 to determine if the measured times $T_1$ and $T_2$ are equal. If $T_1$ equals $T_2$, inquiry 334 is answered in the affirmative, and this means that the time needed to carry out M separate 16-bit data exchanges is the same (within certain tolerances) as the time needed to carry out M 8-bit data exchanges. Since a 16-bit bus clearly accommodates both 8-bit and 16-bit characters, the fact that the measured times are substantially equal means that the bus is 16 bits wide, as represented by instruction 336. However, if the measured times $T_1$ and $T_2$ are markedly different, inquiry 334 is answered in the negative. It is recognized that an 8-bit bus requires two successive data exchange operations to exchange a 16-bit character. Hence, if inquiry 334 is answered in the negative, instruction 338 indicates that the processor bus is only 8-bits wide. After determining whether the processor bus is 16-bits or 8-bits, the bus size computation subroutine terminates, at 340.

As mentioned previously, when data is written into or read from the RAM, the fact that the RAM generally operates at much slower speeds than the processor means that wait states may be designed into the processor to accommodate the slower operating RAM. However, the subroutine illustrated in FIG. 3 is not affected by such wait states because the same number of wait states will be carried out at each bus cycle that a 16-bit or 8-bit character is exchanged between the processor and the RAM.

Although the subroutine illustrated in FIG. 3 executes the 16-bit data exchange before an 8-bit data exchange is executed, it will be appreciated that these operations may be reversed, if desired.

In some applications, bus size computation might be sufficient for determining the identification of the processor. That is, it might be sufficient merely to identify the processor as having an 8-bit or a 16-bit bus. It is preferable, however, to provide a further subroutine for the purpose of determining the particular processor group in the family of which the processor is comprised. For example, if the processor is an Intel processor (which, generally, is known by the user at the time the applications software package is purchased), it is preferred that the processor be identified as an 8086/8088 processor, or an 80186/80188 processor, or an 80286 processor or an 80386 processor. The subroutine illustrated in FIG. 4 determines the particular group of which the processor is a member.

Figure 4:
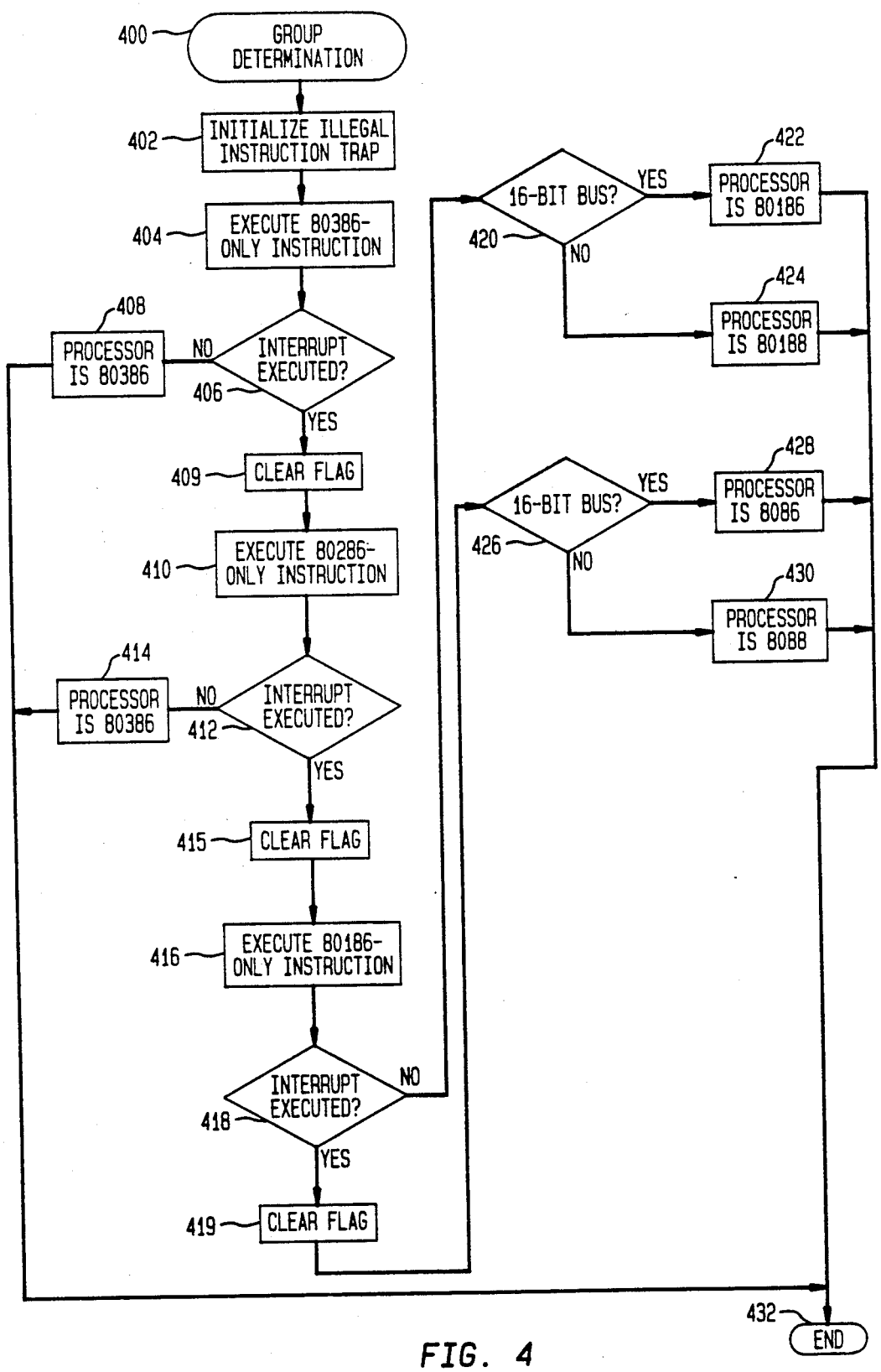
FIG. 4 is a flow chart representing the manner in which the processor is identified.

In executing the group determination subroutine shown in FIG. 4, an illegal instruction trap first is initialized, as represented by instruction 402. Many processors have the capability of detecting "illegal" or non-implementable instruction codes. Typically, the processor responds by generating a unique interrupt. This interrupt can be intercepted, or "trapped", by user software. Thus, instruction 402 identifies the particular memory address which is addressed by the processor when an interrupt occurs due to an illegal instruction. This address contains software adapted to cause a flag to be set in response to such an interrupt.

After the illegal instruction trap is initialized, the processor is instructed to execute an instruction that may be executed only by a Model 80386 processor, as represented by step 404. After this specific instruction is executed, inquiry is made, at 406, to determine if an illegal instruction interrupt has been carried out. It is recognized that if the processor is a Model 80386 processor, then the 80386-only instruction which has been executed will not result in an interrupt. Hence, if inquiry 406 is answered in the negative, it is determined that the processor is a Model 80386 processor, as represented by instruction 408, and the subroutine is terminated.

However, if inquiry 406 is answered in the affirmative, that is, if a flag is set because an illegal instruction has been requested, it is concluded that the processor is not a Model 80386 processor. The flag next is cleared, at 409, and then an 80286-only instruction is executed, as represented by step 410.

If processor 100 is a Model 80286 processor, then it is expected that it is capable of executing an 80286-only instruction. Hence, inquiry 412, which determines whether an interrupt has been executed in response to an attempt to carry out an 80286-only instruction, is answered in the negative. As a result, the processor is identified as a Model 80286 processor, as represented by instruction 414, and this group determination subroutine ends.

However, if inquiry 412 is answered in the affirmative, the flag which has been set as a result of this attempt to execute an illegal instruction is cleared, as at 415, and the subroutine next advances to execute an 80186-only instruction, as represented by step 416.

Inquiry 418 then determines whether an interrupt has been executed in response to this attempt to carry out an 80186only instruction. If inquiry 418 is answered in the negative, the processor must be either a Model 80186 or a Model 80188 processor, both of which have identical instruction sets. Inquiry 420 next is made to determine whether the processor uses a 16-bit bus. The bus-size computation subroutine described above with respect to FIG. 3 may be used to determine the bus size. If inquiry 420 is answered in the affirmative, instruction 422 concludes that the processor is a Model 80186 processor. However, if inquiry 420 is answered in the negative, instruction 424 determines that the processor is a Model 80188 processor. The group determination subroutine then ends.

If inquiry 418 is answered in the affirmative, it is concluded that the processor must be a Model 8088 or a Model 8086—the only other processors in this family. The flag which had been set in response in this attempt to carry out an illegal instruction is cleared, as at 419, and then inquiry 426 is made to determine if the bus size used with this processor is a 16-bit bus. If inquiry 426 is answered in the affirmative, instruction 428 determines that processor 100 is an Model 8086 processor. However, if inquiry 426 is answered in the negative, instruction 430 determines that processor 100 is a Model 8088 processor. Then, the group determination subroutine ends.

The group determination subroutine represented by the flow chart shown in FIG. 4 has been described with respect to the Intel family of microprocessors. It will be appreciated that a similar subroutine may be carried out to identify the particular group of, for example, the Motorola family of processors, of which processor 100 may be a member. Likewise, this subroutine may be executed to identify the particular group of other microprocessor families of which processor 100 may be a member.

Clock Speed

Figure 5:
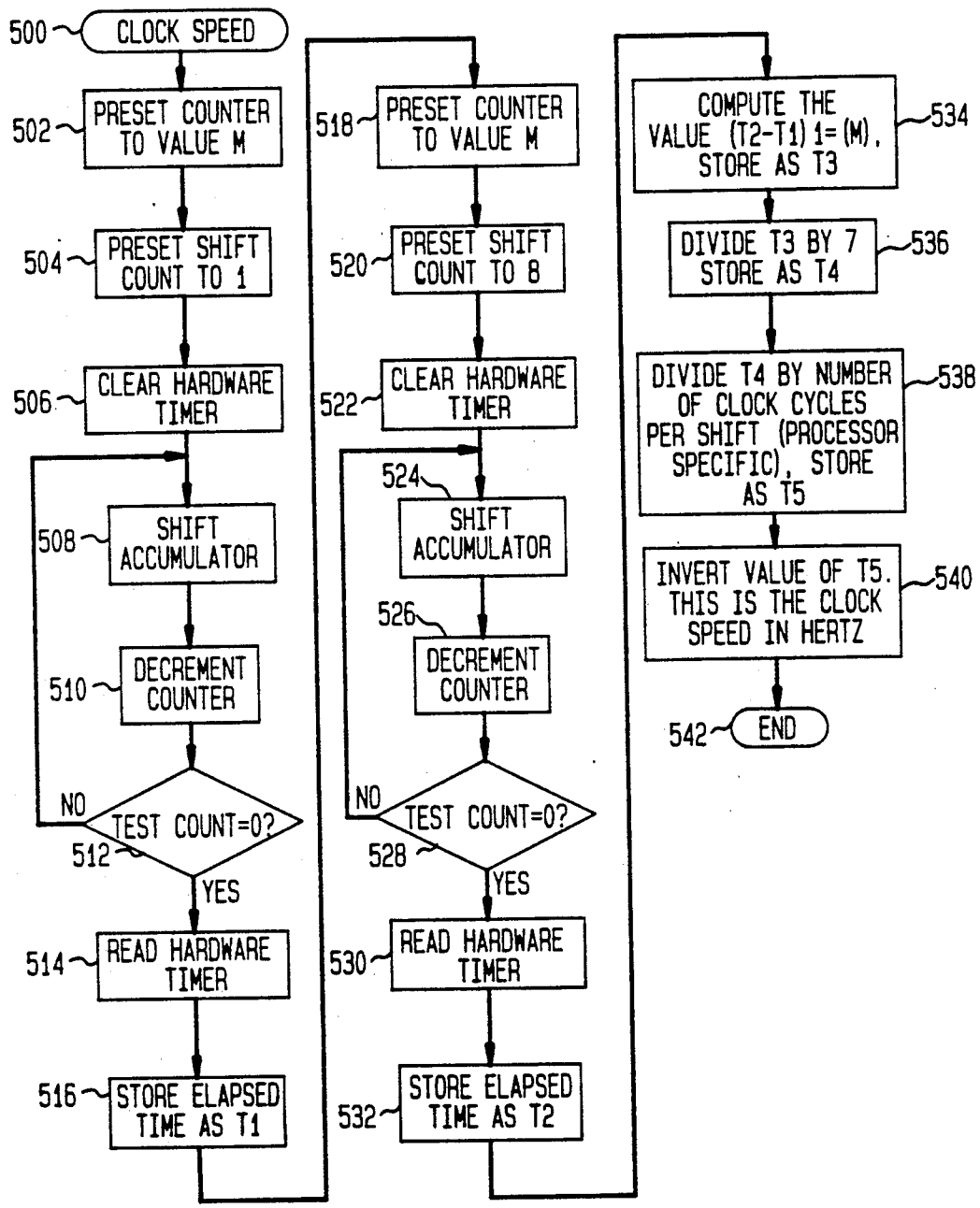
FIG. 5 is a flow chart representing the manner in which the clock speed of the computer system clock generator is determined.

Another component, or characteristic, of the signature of a computer system is the clock speed, or repetition rate, of clock generator 102. The flow chart shown in FIG. 5 operates to determine the value of this clock speed.

The clock speed subroutine commences by presetting a counter to some arbitrary value M, as represented by instruction 502. Then, the count of shift count register 204 (FIG. 2) is preset to a desired count A. For the purpose of the present description, the shift count register is preset to a count of 1, as represented by instruction 504. The subroutine then advances to clear hardware timer 108, as represented by instruction 506. Thereafter, the subroutine advances to instruction 508 whereat the contents of accumulator 200 are shifted by A stages, that is, the contents of the accumulator are shifted by the number of stages determined by the shift count. In the present example, the contents of the accumulator are shifted by one stage (either left or right, the direction not affecting the clock speed subroutine). After the contents of the accumulator have been shifted by the number of stages determined by the shift count, the counter is decremented, as represented by instruction 510. Then, inquiry 512 is made to determine if the count of the counter has been decremented to a count of 0.

If inquiry 512 is answered in the negative, the subroutine cycles to the loop formed by instructions 508 and 510 until the count which had been preset to a value of M is reduced to a count of 0. At that time, inquiry 512 is answered in the affirmative and the subroutine advances to instruction 514 to read hardware timer 108 (FIG. 1). The time which has been measured by the hardware timer is stored as elapsed time $T_1$, as represented by instruction 516. It is appreciated that this elapsed time $T_1$ represents a measurement of the time needed to shift the contents of the accumulator by one stage a predetermined number of times (i.e. M times). After storing elapsed time $T_1$, the clock speed subroutine advances to instruction 518 whereat the counter is preset once again to the value M. Then, the count of shift count register 204 is preset to a count of B. It is desired that B is significantly greater than A. As a numerical example, the shift count register is preset to a counter of 8. Then, the subroutine advances to instruction 522 whereat hardware time 108 is cleared. Once the hardware timer is cleared, the subroutine advances to instruction 524 to shift the contents of the accumulator by the number of stages represented by the count of the preset shift count. That is, step 524 instructs the accumulator to shift the contents thereof by B successive stages. Consistent with the present numerical example, the contents of the accumulator now are shifted by 8 successive stages. Thereafter, the subroutine advances to decrement the count of the preset counter, as represented by instruction 526, and then inquiry 528 is made to determine if the count of this counter has been reduced to a count of 0.

If inquiry 528 is answered in the negative, the loop formed of instructions 524 and 526 is repeated until inquiry 528 is answered in the affirmative. At that time, the subroutine advances to read the hardware timer (instruction 530), and the time represented by the hardware timer is stored as elapsed time $T_2$, as represented by instruction 532.

It is appreciated that elapsed time $T_2$ represents the amount of time which has elapsed for shifting the contents of the accumulator by eight successive register stages M times. The subroutine then advances to instruction 534 whereat the difference between the elapsed times $(T_2 - T_1)$ is determined. This difference in the elapsed times represents the increase in the amount of time needed to shift the contents of the accumulator by eight successive stages rather than by simply one stage. Since the contents of the accumulator have been shifted M times, both in the one-stage shift operation and in the eight-stage shift operation, instruction 534 further computes the value $(T_2 - T_1)/M$. This value is stored as $T_3$ and represents the amount of time needed to shift the contents of the accumulator by (B-A) stages a single time. In the numerical example described herein, $T_3$ represents the amount of time needed to shift the contents of the accumulator by seven successive stages.

After computing the value $T_3$, the subroutine advances to instruction 536 whereat $T_3$ is divided by the value (B-A). Consistent with this example, the value $T_3$ is divided by the numeral 7, resulting in the quotient $T_4$. This quotient $T_4$ is a measure of the time needed to shift the contents of the accumulator simply by one stage. In most embodiments, the computation of $T_4$ is a sufficient measure of the clock speed. However, it is preferable that the clock speed subroutine include the further instructions below to determine both the period of one clock cycle and the repetition rate of the clock generator.

Following the computation of $T_4$, the clock speed subroutine advances to instruction 538 whereat the value $T_4$ is divided by the number of clock cycles required for the processor to shift the contents of the accumulator by one stage. This value of "clock cycles per shift" generally is unique to the particular processor being used and is readily identified once that processor is known, as by the subroutines described in conjunction with FIGS. 3 and 4. For example, the Model 8086 requires 4 separate clock cycles to shift the contents of the accumulator by one stage. The Model 80286 processor requires 2 clock cycles to shift the contents of the accumulator by one stage. Hence, instruction 538 divides the computed value $T_4$ by the clock cycles per shift associated with the specific processor that is used in the computer system. This quotient is stored as $T_5$; and $T_5$ is a measure of the period of 1 clock cycle. Then, the subroutine advances to instruction 540 whereat the value $T_5$ is inverted to provide an indication of the repetition rate, or clock speed, of clock generator 102. The clock speed subroutine then ends, at 542.

In carrying out the clock speed subroutine, it is appreciated that the shift operations all are carried out on the accumulator which is formed of simple shift registers. The shift operations do not require reading or writing data from RAM and, thus, are not dependent upon the amount of time needed to access the RAM. Consequently, the subroutine is independent of RAM speed, refresh times, wait states, etc. Although the instructions for this subroutine may be stored in RAM and, thus, subject to these effects, an identical set of instructions is executed in the two passes which result in $T_1$ and $T_2$. Hence, these effects are equal and cancel each other when the value $T_2 - T_1$ is computed. Rather, the clock speed subroutine provides a simple yet accurate indication of the clock speed (and, thus, the clock period) of the clock generator.

ROM Identification

Figure 6:
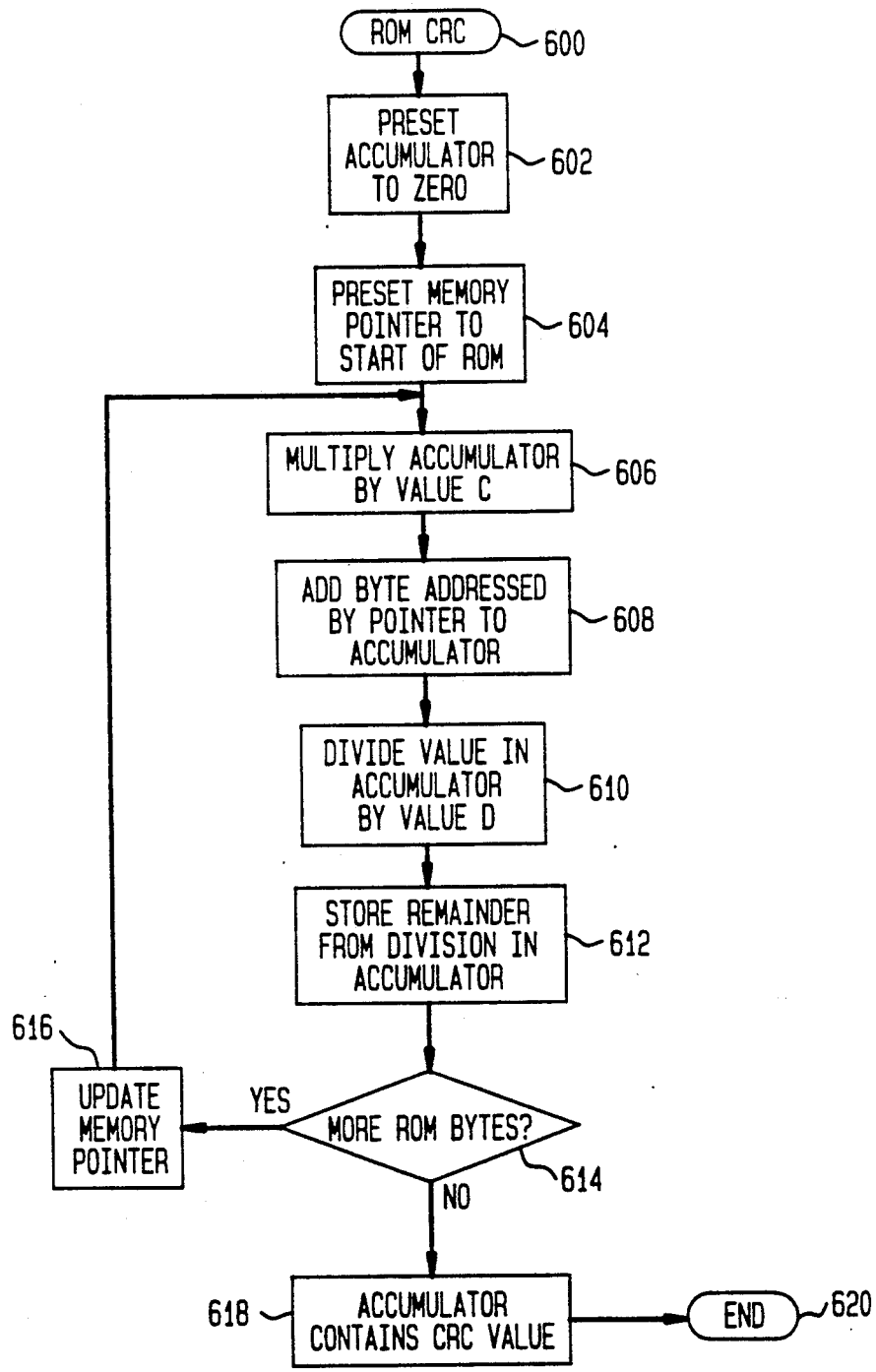
FIG. 6 is a flow chart representing the manner in which the ROM used with the processor is identified.

In an effort to improve and update their microprocessors, microprocessor manufacturers generally design improved and updated instruction sets for those microprocessors. Consequently, two different computer systems which otherwise might appear to be identical, and which may use the very same microprocessor, may include ROMs having different instruction sets which reflect different versions of those ROMs. In addition, to avoid copyright infringement difficulties, two manufacturers of otherwise identical computer systems may use different ROMs. Hence, another component or characteristic of the signature of a computer system is the particular version of the ROM used therewith. One indication of the ROM version is achieved, in accordance with the present invention, by carrying out a "cyclic redundancy check" (CRC) calculation on the contents of the ROM. The flow chart shown in FIG. 6 represents a ROM CRC subroutine which may serve as an identification of the ROM.

The ROM CRC subroutine commences by presetting the contents of the accumulator to 0, as represented by instruction 602. Then, a memory pointer which is used to address successive addresses in the ROM is preset to the start, or beginning address, of the ROM, as represented by instruction 604. The subroutine then advances to instruction 606 which multiplies the contents of the accumulator by a constant value C. C may be any value greater than 1, and as an example, for 8-bit bytes, C=256. If the ROM stores 16-bit characters, then C=65536. If C is a power of 2, the multiplying operation is carried out by shifting the contents of the accumulator left an appropriate number of bits.

After multiplying the contents of the accumulator by the value C (which, in the first operation, results in a value of 0), the subroutine advances to instruction 608 which adds to the contents of the accumulator the 8-bit or 16-bit character stored in the ROM which then is being addressed by the memory pointer. Then, the summed value in the accumulator is divided by a constant D. Preferably, the constant D is a relatively large prime number and, in the preferred embodiment, D is the largest prime number less than $2^{16}$. For example, D may be 65,521.

After carrying out instruction 610, the subroutine advances to instruction 612 whereat the quotient obtained by dividing the value stored in the accumulator by the constant D is discarded, and the remainder is stored in the accumulator. The subroutine then advances from instruction 612 to inquiry 614 to determine if all of the contents of the ROM have been addressed by the memory pointer, that is, inquiry is made if more bytes remain stored in the ROM. If this inquiry is answered in the affirmative, the memory pointer is updated, as at 616, and the multiplication, addition, division and remainder-storage steps represented by instructions 606–612 are repeated. The subroutine cycles through this loop until inquiry 614 is answered in the negative. As a numerical example, the ROM used with a Model 80286 processor generally has approximately 16,000 (16K) bytes. When inquiry 614 is answered in the negative, the value then stored in the accumulator is used as the CRC value, as represented by instruction 618. This CRC value provides an indication of the version of the ROM and, thus, the determined CRC value represents an identification of the ROM. The ROM CRC subroutine represented by the flow chart of FIG. 6 then ends.

By selecting a relatively high prime number for D, the probability is only one chance in D that two different ROM contents, that is, two different versions of ROM, would yield the same CRC value.

The RAM CRC subroutine has been described in conjunction with the ROM normally associated with processor 100. It is appreciated that, if the computer system is used with a hard disk drive, the usual disk drive controller also may be provided with a ROM. The flow chart shown in FIG. 6 may be used to identify the processor ROM or the disk drive controller ROM or, if desired, this subroutine may be carried out twice, once to identify the processor ROM and once to identify the disk drive controller ROM. Either or both of these ROM identifications may be used as a component of the computer system signature.

RAM Wait States

Figure 7:
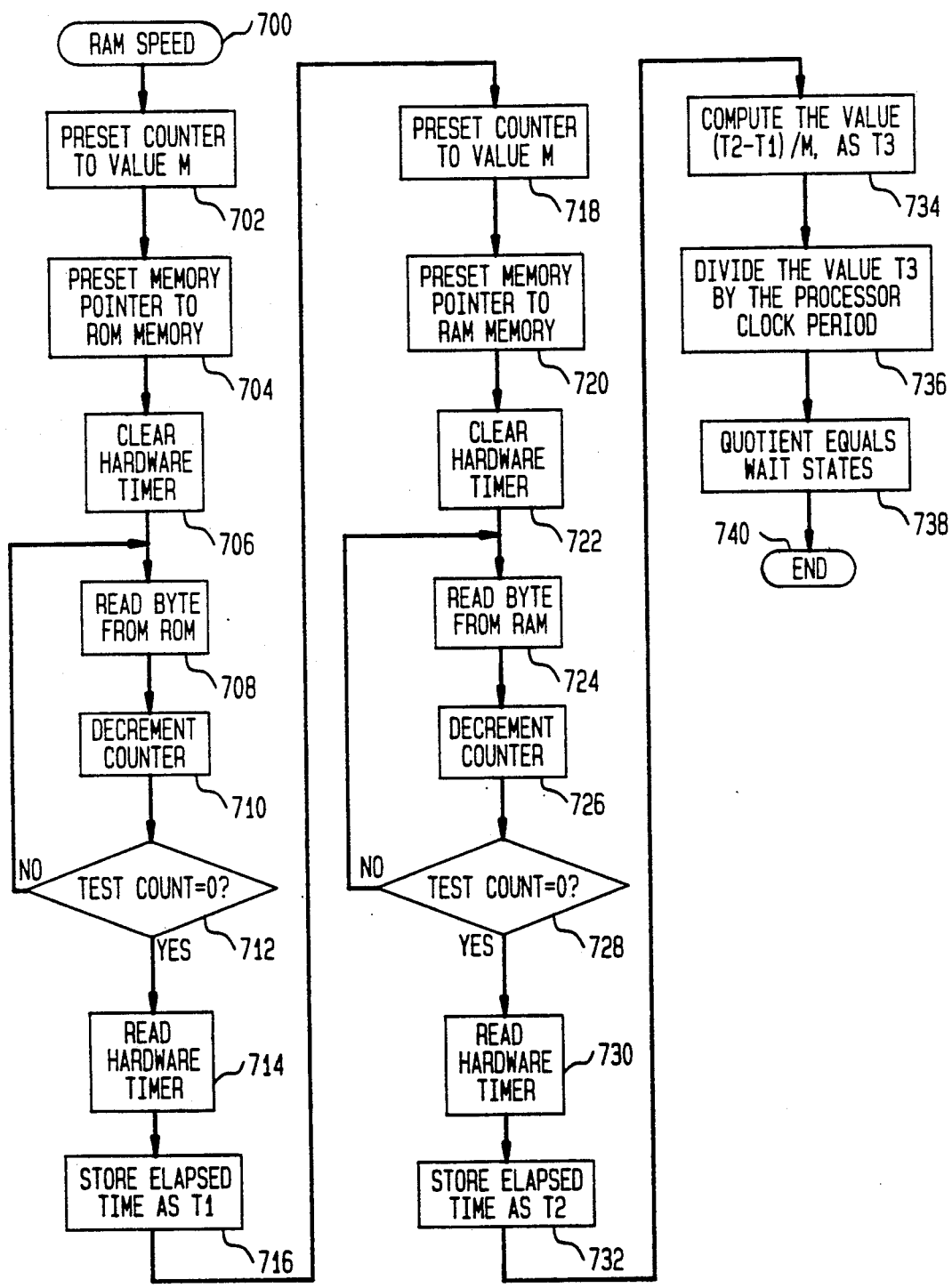
FIG. 7 is a flow chart representing the manner in which the wait states of the processor are determined.

As mentioned previously, to accommodate low-cost RAM devices, the access speed of a typical RAM, that is, the time needed to read from and write to the RAM, is significantly greater than the time needed for the processor to execute a single instruction. Hence, to match the processor to the slower operating RAM, wait states normally are imparted to the processor during which the processor remains idle to allow the RAM to "catch up" in its operation. The number of wait states and, thus, the wait time of the RAM comprise yet another component, or characteristic, of the computer system signature. The RAM wait state subroutine represented in FIG. 7 is used to determine both the wait time and the wait states of the RAM. The determination proceeds on the recognition that the processor ROM normally operates at sufficiently high speeds such that it may be accessed without requiring any wait state.

The RAM wait state subroutine is carried out by presetting a counter to an arbitrary value M, as represented by instruction 702. Then, the subroutine advances to instruction 704 whereat a memory pointer is preset to a desired ROM memory location. The subroutine then advances to clear the hardware timer, at 706, and then a byte is read from the memory location in the ROM which then is addressed by the memory pointer, as represented by instruction 708. The particular ROM location as well as the contents of the byte are not relevant to the RAM wait state subroutine because the information read from the ROM is not used. Rather, it is the time needed to access the ROM that is pertinent to this subroutine.

After the byte is read from the addressed location of the ROM, the subroutine advances to decrement the counter by a value of 1, as represented by instruction 710. Thereafter, inquiry 712 is made to determine if the count of the counter has been decremented from its initial preset count of M to a final count of 0. If this inquiry is answered in the negative, the subroutine cycles through the loop formed of instructions 708 and 710 until inquiry 712 is answered in the affirmative. At that time, the hardware timer is read (instruction 714) and this time is stored as elapsed time $T_1$, as represented by instruction 716. Thus, $T_1$ represents the amount of time needed for M successive ROM access operations, none of which includes any wait time.

The RAM wait state subroutine then advances to instruction 718, whereat the counter is preset to the value M once again. Then, a RAM memory pointer is preset, as at 720, and the hardware timer is cleared once again, as represented by instruction 722. The subroutine then reads a byte from the location in RAM then addressed by the memory pointer, as represented by instruction 724. It will be appreciated that the particular location which is being addressed and the particular contents being read are not pertinent to the RAM wait state subroutine. Rather, this subroutine utilizes the time needed to access the RAM to determine the number of wait states.

After carrying out instruction 724, the subroutine advances to instruction 726 whereat the counter is decremented by a value of 1. Inquiry 728 then is made to determine if the counter has been decremented to a count of 0. If this inquiry is answered in the negative, the subroutine cycles through the loop formed of instructions 724 and 726 until inquiry 728 is answered in the affirmative. At that time, the hardware timer is read and the time read from the hardware timer is stored as elapsed time $T_2$. It is seen that $T_2$ represents the amount of time needed to execute M successive RAM access operations, this time including the wait time that has been designed into the memory architecture of the computer system.

After the elapsed time values $T_2$ and $T_1$ have been stored, the subroutine advances to instruction 734 whereat the difference between these elapsed times is determined. This difference represents the total wait time that has been imparted to accommodate the slower speed of the RAM. As represented by instruction 734, the elapsed time differential is divided by the factor M and stored as the value $T_3$. This time value $T_3$ represents the wait time needed to carry out one access operation of the RAM.

The processor then advances to instruction 736 whereat the value $T_3$ is divided by the clock period of clock generator 102. It is recalled from the flow chart shown in FIG. 5 that this clock period is determined by the clock speed subroutine. The resultant quotient is used by instruction 738 as an identification of the number of wait states which have been imparted to match the higher operating speed of the processor to the lower operating speed of the RAM. The RAM wait state subroutine then ends.

Although a single ROM read operation and a single RAM read operation may be used to determine the processor wait time, it is preferred that a number of read operations (e. g. M read operations) be carried out so as to minimize any eccentricities that might be present during a single read operation. It is this same principle which has been used in the clock speed subroutine and in the bus size subroutine discussed above. By relying upon several memory access operations, eccentricities may be "averaged out". For those computer systems in which operation of the ROM is slower than that of the RAM, as represented by $T_1 T_2$, the aforedescribed operation may be reversed, whereby the number of wait states imparted to access the ROM is calculated.

Disk Drive

Figure 8:
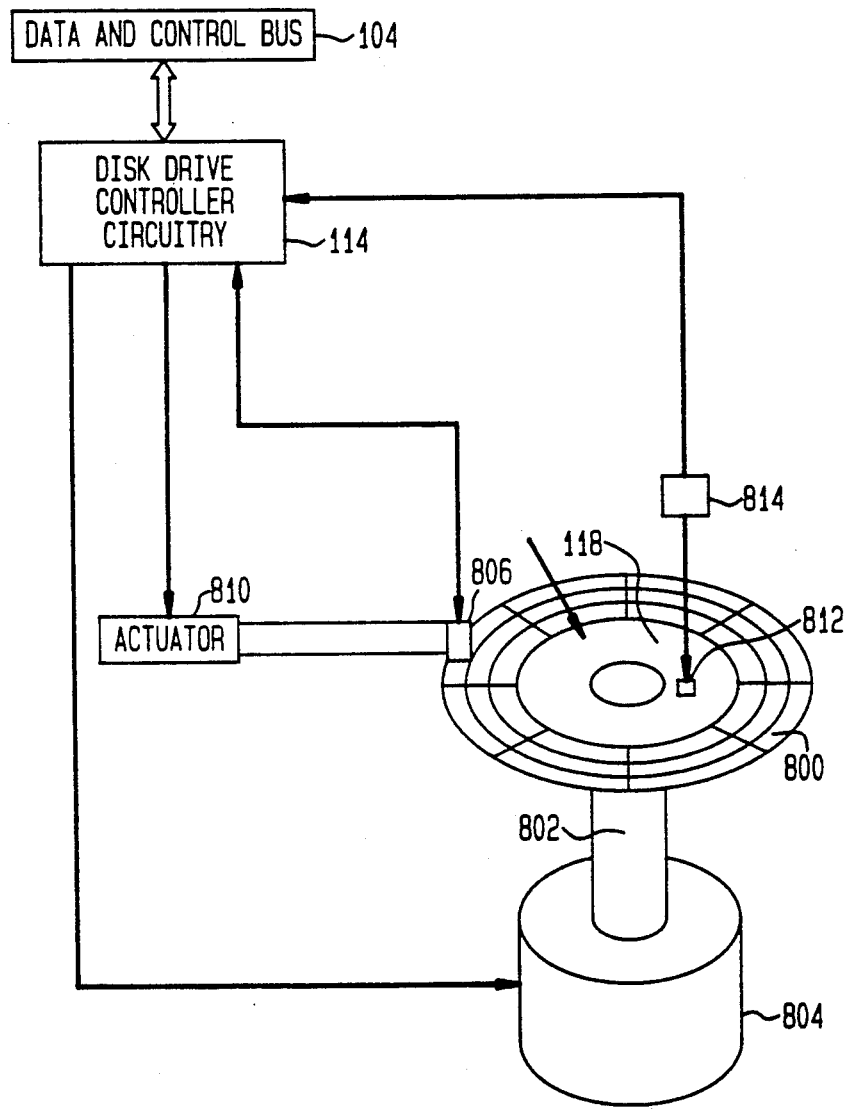
FIG. 8 is a block diagram of a typical disk drive system that may be used with the computer system.

A typical computer system normally is provided with one or more disk drives, typically hard disk or floppy disk drives. A preferred computer system configuration is provided with a hard disk drive and with a floppy disk drive, the latter, of course, being used to read and install a desired applications software program onto the hard disk drive. FIG. 8 is a block diagram representing a typical disk drive arrangement, wherein the disk drive may be either a floppy disk drive or a hard disk drive. In either case, data is written to or read from the disk medium by way of a disk drive controller 114 which communicates with data and control bus 104. Of course, a floppy disk drive utilizes a single floppy disk; whereas a hard disk drive utilizes one or several hard disks and is capable of storing a significantly greater amount of data on each disk than may be stored on a single floppy disk.

FIG. 8 is a diagrammatic representation of a disk drive arrangement, either floppy or hard disk drive, comprising a storage medium 118, which may be a single floppy disk wherein data is recorded on one or both surfaces, or may comprise one or several so-called hard disk platters. In both types of disk drives, the disk is rotated by a motor 104 for the recording of data in adjacent sectors 800 on concentric circular tracks, the data being reproduced or recorded by a read/write head 806 which is moved across the tracks and positioned at a desired track by an actuator 810. In hard disk drive systems, the actuator may be formed as a linear or rotary actuator, and it is appreciated that several read/write heads may be used, each head cooperating with a respective surface of a hard disk platter.

In a floppy disk drive arrangement, floppy disk 118 is provided with an index mark 812 sensed by an index mark sensor 814, thus determining when the floppy disk is rotated and sensing a preset, or initial sector, such as the first sector, which may be aligned with the index mark. A similar index mark may be provided in a hard disk drive. It is appreciated that, by sensing the index mark, the speed of rotation and the duration needed to complete one full rotation may be determined.

Since disk drive arrangements are known to those of ordinary skill in the art, and since the particular operation of such disk drive arrangements to read and write data form no part of the present invention per se, further description of the disk drive shown in FIG. 8 is not provided. Rather, the specification proceeds with a description of those subroutines by which the disk drive rotation speed, the disk drive access speed (i. e. the speed at which the heads are driven across the concentric tracks on the disk) and the sector interleave value (i. e. the number of sectors which are interspersed between two logically successive sectors) are determined and used as components of the computer system signature.

Disk Drive Rotation Speed

Figure 9:
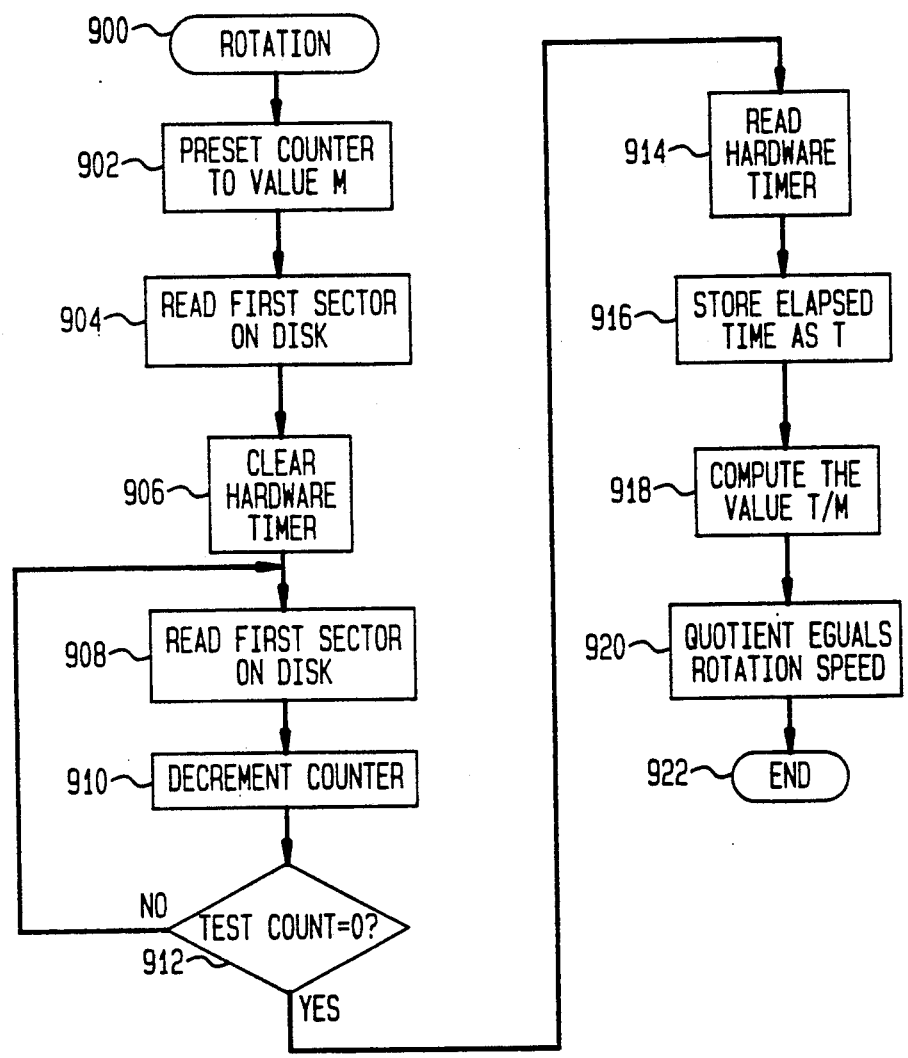
FIG. 9 is a flow chart representing the manner in which disk drive rotation speed may be determined.

FIG. 9 is a flow chart illustrating the disk drive rotation speed subroutine that may be carried out in accordance with the present invention. The disk drive rotation speed subroutine commences by presetting a counter to an arbitrary value M, as represented by instruction 902. Then, a predetermined sector, preferably the first sector (such as the sector aligned with the index mark) is read from the disk. The particular contents of this sector form no part of the present invention per se. After the first sector is read, hardware timer 108 is cleared. The subroutine then advances to read that same predetermined sector, that is, to re-read the first sector, as represented by instruction 908. After re-reading the first sector, the counter is decremented by a value of 1, and an inquiry 912 determines if the count has been decremented from its initial value of M to a count of 0. If this inquiry is answered in the negative, the subroutine cycles through the loop formed of instructions 908 and 910 until the counter has been decremented to a count of 0. At that time, the hardware timer which had been cleared after the initial reading of the first sector is read, as represented by instruction 914, and the elapsed time is stored as T (instruction 916).

The subroutine then computes the quotient T divided by M, as called for by instruction 918, and the computed quotient thus represents the amount of time needed for one complete rotation of the disk. This quotient therefore equals the rotation speed of the disk drive arrangement, as represented by instruction 920. The disk drive rotation speed subroutine then ends.

It will be appreciated that the hardware timer is cleared when the initial portion of the first sector is read, as represented by instructions 904 and 906, and this timer then is read when the initial portion of this first sector is read for the M-th time. Hence, the hardware timer is cleared and read when the disk rotates to the very same location. Also, succeeding read operations, i. e. the second, third, . . . mth read operations, cannot be completed until the disk has been rotated to return the predetermined sector (assumed herein to be the first sector) to the read/write head. Consequently, the elapsed time measured by the hardware timer is an indication of the time needed for the disk to make M complete rotations. Instruction 918 computes the amount of time needed for the disk to complete only a single rotation. The subroutine then advances to instruction 920 to indicate that the quotient determined by instruction 918 is a measure of the rotation speed of the disk drive. This ends the rotation speed subroutine.

The disk drive rotation speed may be determined simply by taking one measurement of the elapsed time needed for two successive read operations from a given sector on the disk. The time duration for one rotation is measured at the commencement of the sector read operation, and this time duration measurement ends at the commencement of the very next sector read operation. However, because of aberrations that might be present in head settling, actual disk rotation speed, and the like, it is preferred to execute several (or M) read operations to permit the disk to rotate M times. Such M rotations serve to "average out" any aberrations that might be present.

Head Access Speed

Figure 10:
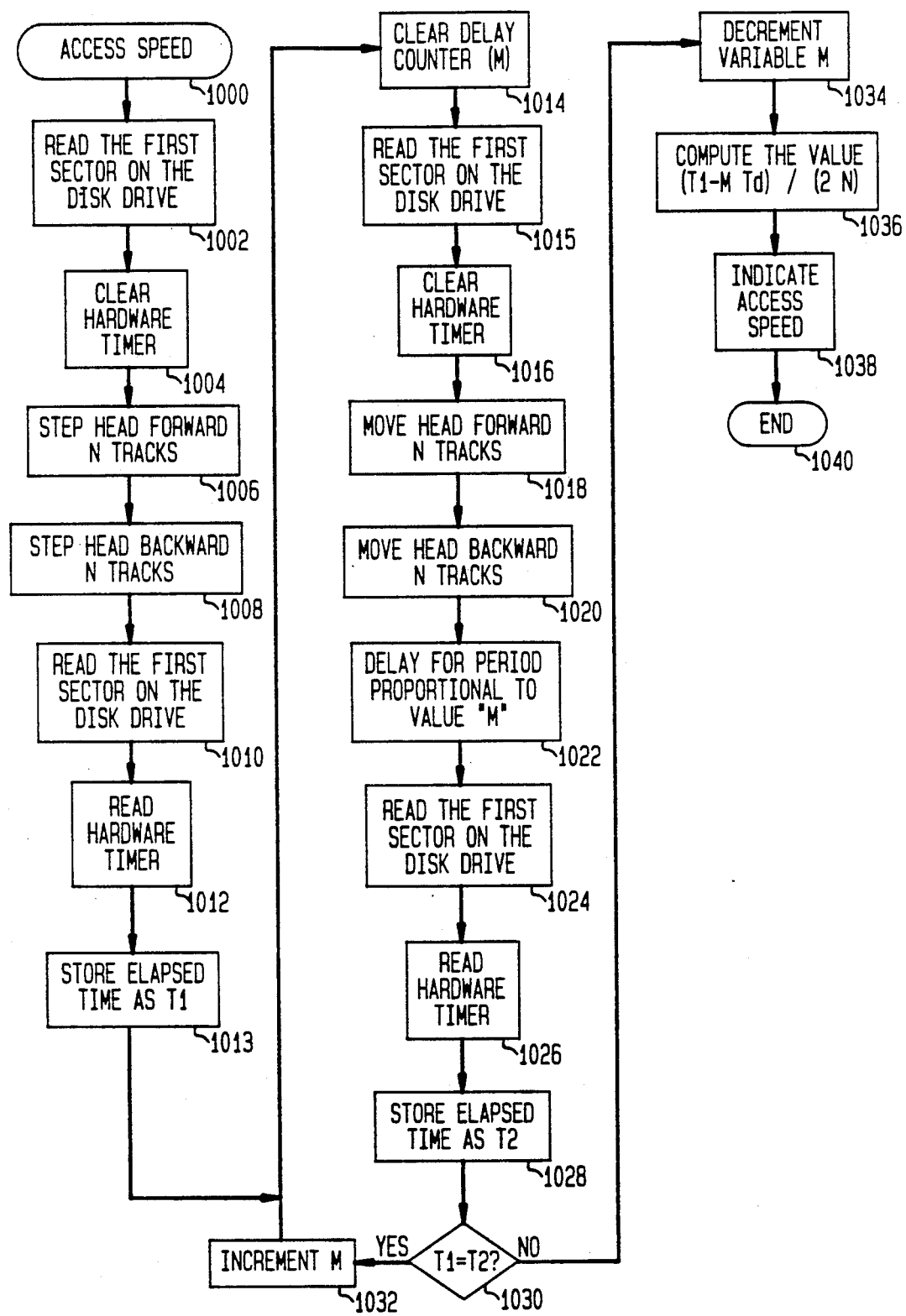
FIG. 10 is a flow chart representing the manner in which disk drive access speed may be determined.

Yet another component, or characteristic, in the signature of a computer system resides in the speed at which the read/write head (or heads) move from one track to the next on the disk medium. Floppy disk drives and several low-cost hard disk drives utilize linear actuators to step the heads from track to track. Higher performance hard disk drives generally rely on rotary actuators to move the heads. When the head is moved from one track from which data has been read or written to an adjacent track for a subsequent read or write operation, the head driving speed generally is significantly less than the speed at which the head may be driven across several tracks. FIG. 10 illustrates a flow chart which represents the manner in which the head access speed is measured when the heads are driven across several (e. g. N) tracks.

The access speed subroutine illustrated in FIG. 10 commences by reading a predetermined sector from the disk drive, as represented by instruction 1002. For convenience, this predetermined sector is assumed herein to constitute the first sector, and this first sector may be located in the first track of a floppy disk medium or in the first track of a particular hard disk medium. It will be apparent from the ensuing discussion that the particular sector, the particular track and the particular disk that is being read is not critical. Furthermore, the information read from that sector is not relevant to the present invention. Rather, it is merely the fact that a sector is accessed, as by reading information therefrom, that is used by the illustrated subroutine.

After the first sector is read, the subroutine advances to instruction 1004 whereat hardware timer 108 is cleared (or, more generally, the hardware timer is initialized). Then, the read/write head is moved forward by a predetermined number (e. g. N) tracks, as called for by instruction 1006, and is returned to its starting track by being moved backward by the same number N of tracks, as represented by instruction 1008. Thereafter, the first sector on the disk drive is read again, as called for by instruction 1010. It is recognized that the elapsed time between instructions 1002 and 1010 is a measure of the time for the disk to make one (or an integral number of) complete rotation. This time duration is measured, or read, in response to instruction 1012, and the elapsed time is stored as time $T_1$ (instruction 1013).

After the time needed to make one (or an integral number of) complete rotation has been stored as time $T_1$, a delay counter is cleared, as indicated by instruction 1014, which functions to initialize a variable (referred to as M) to zero. If the count of this delay counter is represented as M, then instruction 1014 sets this counter to M=0. As will be described, the value of the count M of the delay counter determines the value of a time delay which is added to the time needed to carry out the various operations called for by the access speed subroutine. As M increases, this time delay likewise increases.

After clearing the delay counter (i. e. after setting M=0), the first sector on the disk drive is read once again, as indicated by instruction 1015. Then, similar to instruction 1004, the hardware timer is cleared once again (instruction 1016). The subroutine then advances to instruction 1018 which calls for moving the read/write head forward by N tracks, and then to instruction 1020 which commands the read/write to move backward by that same number N of tracks. The subroutine then imparts a time delay $MT_d$ for a period of time proportional to the count M of the delay counter (instruction 1022). In the present example, since M=0, the added time delay is substantially equal to 0. $T_d$ is a constant time period.

After imparting the aforementioned time delay, the subroutine advances to instruction 1024 and the first sector on the disk drive is read once again. It is appreciated that, depending upon the speed at which the heads are moved in the forward and backward direction, the number of tracks N which have been traversed by the head, and the delay $MT_d$ which has been imparted by instruction 1022, it is likely that the overall time needed for the disk drive to respond to instructions 1015-1024 is equal to the time for the disk to make one (or an integral number) complete rotation. The actual time which has elapsed between instructions 1015 and 1024 is measured by reading the hardware timer, as called for by instruction 1026, and this measured time is stored as time $T_2$ in response to instruction 1028. The subroutine then advances to inquiry 1030 to determine if $T_1=T_2$.

If M=0, it is probable that the time $T_N$ for the read/write head to move forward N tracks plus the time $T_N$ for the read/write head to move backward N tracks plus the imparted time delay $MT_d$ is less than the time for the disk to make one complete rotation (or to make an integral number of rotations). ($T_N=NT_s$, where $T_s$ is the time required for the read/write head to move one track.) Hence, following instruction 1022, it is most probable that the read/write head simply must "wait" until the first sector returns to the position whereat it may be read. That is, $T_N+T_N+MT_d<T_1$. If $T_W$ represents the waiting time following instruction 1022 for the disk to return the first sector to the position whereat it may be read, then $T_2=2T_N+MT_d+T_W=T_1$. Consequently, inquiry 1030 is answered in the affirmative.

If $T_1=T_2$, as noted above, then the subroutine advances to instruction 1032 whereat the count M of the delay counter is incremented. As a result, the imparted time delay $MT_d$ likewise is increased. The subroutine then advances to execute instructions 1014-1028. Once again, inquiry 1030 is made, and so long as $2T_N+MT_d<T_1$, this inquiry is answered in the affirmative.

The subroutine cycles through the loop formed of instructions 1014-1032 until the count M of the delay counter has been increased sufficiently such that $2T_N+MT_d<T_1$. When the cumulative time $2T_N+MT_d$ is just greater than $T_1$, the time for the disk to make one (or an integral number) complete rotation, the first sector (that is, the sector to be read by the head) will have just passed the head at the time that instruction 1024 is to be executed. Consequently, one additional rotation of the disk is needed before that sector returns to the head, thereby enabling instruction 1024 to be completed. Thus, the total time to cycle through the loop formed of instructions 1014-1032 will increase by the amount of time needed for this one additional rotation of the disk. At that time, (i. e. after the first sector is read, as called for by instruction 1024), inquiry 1030 is answered in the negative. Accordingly, the subroutine advances to instruction 1034 whereat the variable M is decremented by one. For this value of M (i. e. M decremented by one), $2T_N + MT_d$ is substantially equal to $T_1$ and $T_W$ is substantially equal to zero. Instruction 1036 now computes the difference between the time for the disk to make one complete rotation ($T_1$) and the imparted time delay ($MT_d$) It is recognized that this time differential is equal to the time $2T_N$ (or $2NT_s$) for the read/write head to move forward and then backward across N tracks. Instruction 1036 further computes the quotient of this time differential divided by twice the number of tracks (2N), resulting in the time $T_s$ for the read/write head to traverse one track. This head access speed thus is represented as $(T_1 - MT_d)/(2N)$. The subroutine then advances to instruction 1038 whereat the computed value is used as an indication of the access speed of the disk drive. This subroutine then ends.

Disk Interleave Value

Figure 11A:
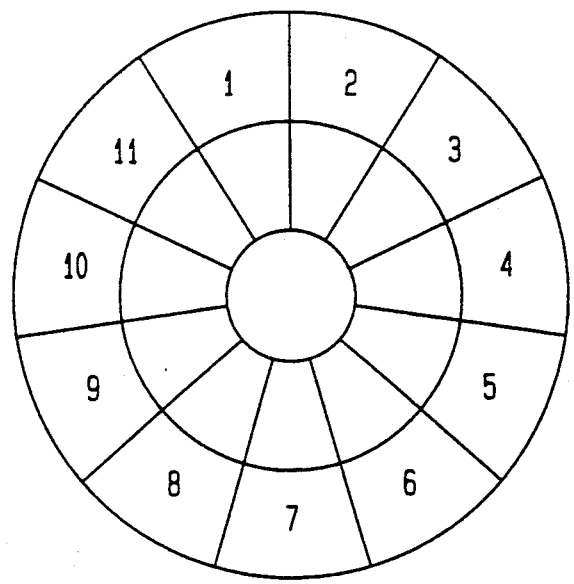
FIGS. 11A and 11B are schematic representations of interleaved sectors provided on a disk.
Figure 11B:
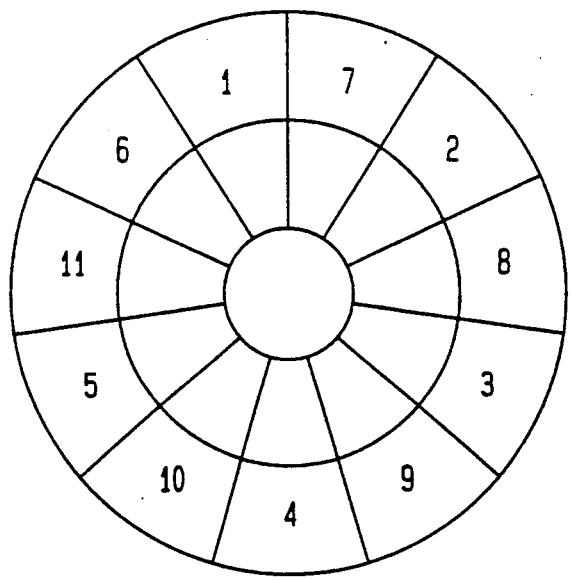

As is conventional, data is recorded in sectors in each track on each surface of a floppy disk or hard disk medium. This sector recording operation generally is controlled by the disk drive controller and, as is conventional, an index of those records which are recorded in the various sectors is compiled and stored on the disk. The disk drive controller determines the number of sectors into which a given track is divided. While the number of sectors may vary from one controller to another and, thus, from one disk drive to the next, various standards have been adopted by the industry, including 17 sectors per track, 26 sectors per track, etc. FIGS. 11A and 11B represent the recording of eleven sectors per track on a disk medium.

As illustrated in both Figures, sectors are recorded adjacent one another. In FIG. 11A, successive sectors 1, 2, 3, ... 10, 11 are recorded, in order, and the physical number of the sectors is seen to be the same as the logical number thereof. That is, sectors 1 and 2 are adjacent each other and no other sector is interleaved therebetween. Hence, the sector bearing logical number 2 is located in the second physical position adjacent logical sector 1 and, likewise, logical sector 3 is located in the third physical position adjacent logical sector 2. Hence, for the case where the logical and physical numbers of the sectors are the same, the disk is designated as having a sector interleave value of one. For an interleave value of 1, the rotational speed of the disk must be slow enough such that if data is read from (or written to) sector 1 and then immediately following this read (or write) operation sector 2 is addressed, the disk does not make one complete rotation. That is, the time needed to access sector 2 after sector 1 has been accessed should be no greater than the time needed to bring sector 2 to the read/write head. However, for faster rotational speeds of the disk, it is probable that a portion of sector 2 will have passed the read/write head at the time the head is made ready to access that sector. In this case, for a sector interleave value of 1, the beginning portion of the information recorded on sector 2 might be missed. To avoid this difficulty, sector 2 is spaced from sector 1 by interleaving one or more different sectors between sectors 1 and 2.

FIG. 11B illustrates a sector interleave value of 2, wherein the second physical sector (i. e. the sector adjacent sector 1) is seen to be logical sector 7, and the second logical sector (sector 2) is spaced two physical sectors away from sector 1. With a sector interleave value of 2, it is appreciated that sector 2 may be accessed immediately following sector 1 without requiring the disk to make a complete rotation to bring sector 2 to the head location. However, if the disk rotation speed still is too fast to permit sector 2 to be accessed immediately following sector 1 without requiring a full rotation of the disk, then sector 2 may be spaced further from sector 1, thereby resulting in a sector interleave value of 3 or more. The sector interleave value adopted by a particular disk drive system comprises yet another component, or characteristic, of the signature of the computer system. The manner in which the sector interleave value is measured is represented by the flow chart shown in FIG. 12.

Figure 12:
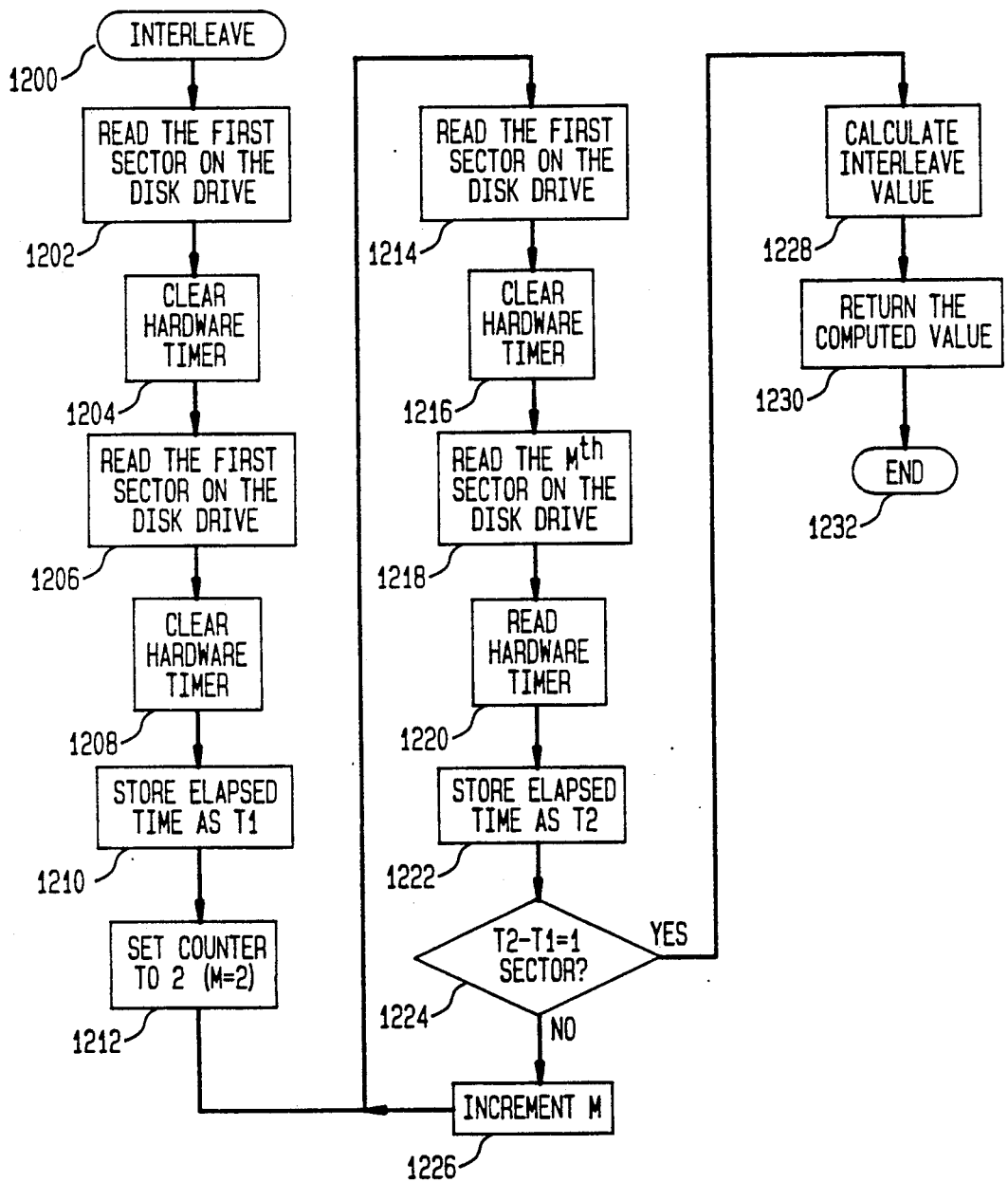
FIG. 12 is a flow chart representing the manner in which the interleave value of the interleaved sectors (shown in FIGS. 11A and 11B) may be determined.

The sector interleave subroutine represented by the flow chart shown in FIG. 12 commences by reading a predetermined sector, such as the first sector, from the disk drive. Then, hardware timer 108 is cleared (instruction 1204) and the first sector is read once again from the disk drive, as represented by instruction 1206. The hardware timer then is read, as indicated by instruction 1208, and the time elapsed between the first and second read operations is represented by the time $T_1$ which is read from the hardware timer. This time $T_1$ is stored, as indicated by instruction 1210, and represents the time for the disk to make one complete rotation. That is, the time to read and then re-read a particular sector is seen to be equal to the time for the disk to complete a rotation.

The subroutine then advances to instruction 1212, whereat a counter is set to an initial value of 2. If the count of this counter is represented as M, then instruction 1212 achieves the function $M = 2$. The subroutine then proceeds to instruction 1214, whereat the first sector is read once again from the disk drive, and then, as represented by instruction 1216, the hardware timer is cleared once again.

After the first sector is read and the hardware timer is cleared, the M-th sector is read from the disk drive. In the present case, the second sector is read, and it should be recognized that instruction 1218 is directed to the logical number of the sector and not to the physical number thereof. Thus, instruction 1218 directs the disk drive to read the logical second sector, regardless of where this logical sector may be located. If the sector interleave value is equal to 1, then the second sector is seen to be directly adjacent the first sector which had just been read. However, if the sector interleave value is 2, then the second sector is spaced from the first sector (which had just been read) by an interleaved sector. Likewise, if the sector interleave value is equal to 3, then the second sector which is read in response to instruction 1218 is spaced from the first sector which had been read In response to instruction 1214 by two other interleaved sectors.

After the M-th (or, in this case, the second) sector is read, the hardware timer is read, as represented by instruction 1220. The elapsed time from the reading of the first sector to the reading of the M-th sector is stored as elapsed time $T_2$.

The sector interleave subroutine then advances to inquiry 1224 to determine if the difference between the elapsed times $T_2$ and $T_1$ is equal to the time for one sector to rotate past the read/write head. Since the number of sectors recorded in a track is known, and since the time $T_1$ for the disk to make one complete rotation has been measured, the time for one sector to rotate past the read/write head can be computed merely by dividing the time $T_1$ by the number of sectors per track. If elapsed time $T_2$ is greater than time $T_1$ merely by the amount of time needed for one sector to rotate past the read/write head, then it is known that the time between the reading of the first sector (instruction 1214) and the reading of the second sector (instruction 1218) is equal for the disk to make one complete rotation plus the time for rotating one sector past the read/write head. Hence, if inquiry 1224 is answered in the affirmative, the logical second sector is seen to be physically located directly after the first sector. However, if the time for reading the second sector is greater than the time for the disk to make one complete rotation plus the additional time for only a single sector to rotate past the read/write head, then inquiry 1224 is answered in the negative. This means that the logical second sector is not located adjacent the first sector.

If inquiry 1224 is answered in the negative, the value of M is incremented (in the present case, it is incremented from a count of 2 to a count of 3), and instructions 1214-1224 are repeated. The subroutine cycles through this loop until inquiry 1224 is answered in the affirmative. At that time, the value of M is related to the logical number of the sector which is located adjacent the first sector. For example, in FIG. 11B, it is seen that sector number 7 (i. e. the sector whose logical number is 7) is recorded adjacent the first sector. In this case, the value of M would have been incremented to 7 when inquiry 1224 is answered in the affirmative.

In response to an affirmative answer to inquiry 1224, the sector interleave value is calculated as a function of the value of M to which the counter has been incremented, as represented by instruction 1228. The computed sector interleave value then is stored as the measure of yet another component included in the signature of the computer system. The sector interleave subroutine then ends.

Authorization/Applications Program

Figure 13A:
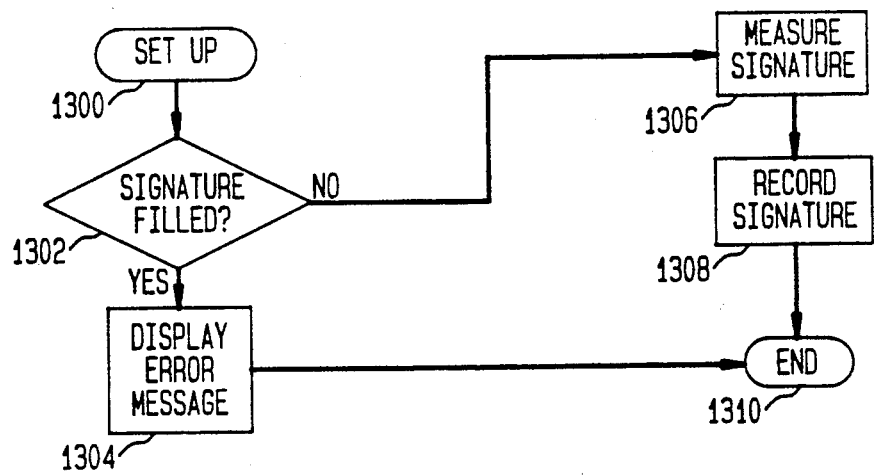
FIGS. 13A and 13B are flow charts representing the manner in which the present invention may be incorporated into an applications software program.
Figure 13B:
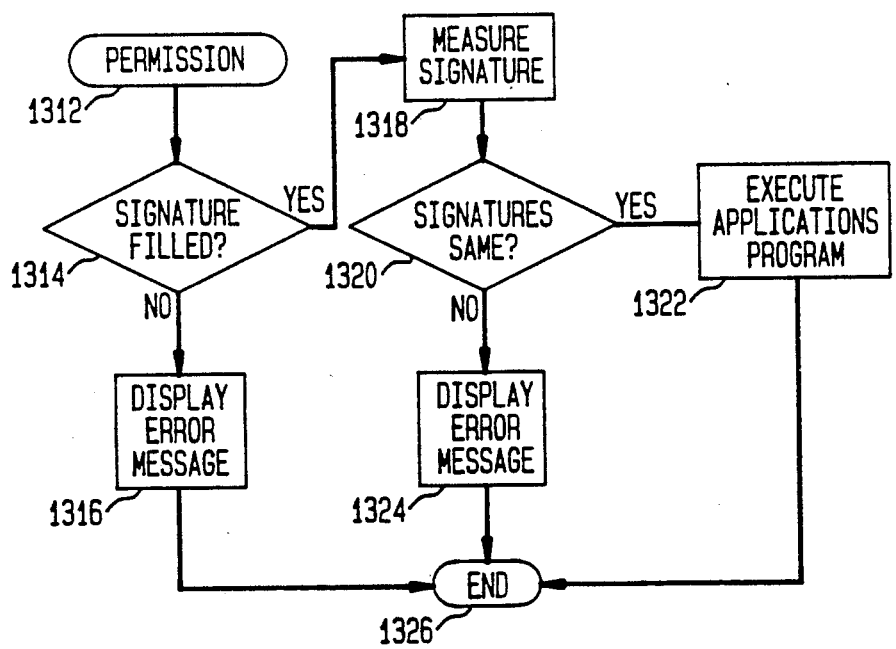
Figure 14:
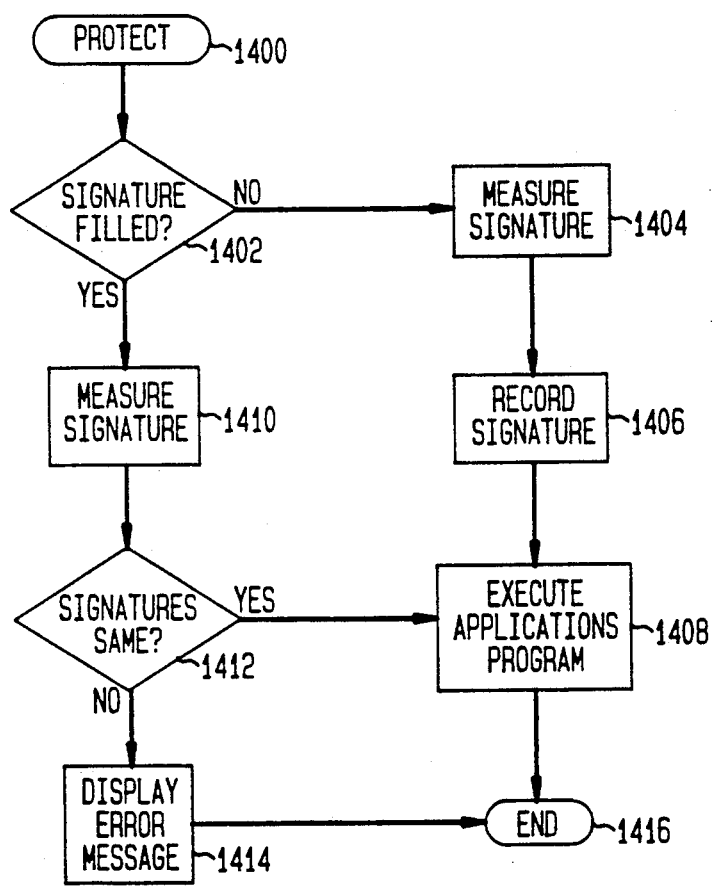
FIG. 14 is a flow chart representing yet another technique by which the present invention is incorporated into an applications software program.

The foregoing has described the manner in which the various components of the signature of a computer system are measured. The aforedescribed technique may be combined with an applications software package to control the execution of the applications program only if the computer system on which the applications program is intended to be run is an authorized computer system. FIGS. 13A and 13B represent two separate, independently executed subroutines which utilize the aforedescribed authorization technique; and FIG. 14 is a flow chart representing a single subroutine for establishing and determining authorization.

Referring first to the flow chart shown in FIG. 13A, a so-called set up procedure is represented by which the signature of the computer system on which the applications program is to be run first is determined. The signature, once determined in accordance with the subroutines discussed above, is stored in the software. It is expected that, when the applications software package first is installed by a user, no prior signature will be stored. Once a signature is measured and stored, that signature cannot be changed without authorization from the software manufacturer. Accordingly, in carrying out the set up procedure, inquiry 1302 first is made to determine if a signature has been stored in the software. If this inquiry is answered in the affirmative, the set up procedure terminates and a suitable error message is displayed, as represented by instruction 1304. It is appreciated that this prevents a user from changing the signature that has already been measured and stored in the software.

However, if inquiry 1302 is answered in the negative, for example, if this constitutes the first attempt to run the set up procedure, the signature of the computer system with which the software is used is measured, as represented by instruction 1306. The manner in which the signature is measured has been discussed in detail hereinabove with respect to the various subroutines represented by the flow charts of FIGS. 3-12.

After the signature of the computer system has been measured, it is recorded, or stored, in the software integrated with the applications program. Thus, the set up procedure may be carried out once and only once to insure that the applications program cannot be used first by an authorized computer system (i. e. by the computer system which first runs that applications program), and then by another, unauthorized computer system.

After the set up procedure shown in FIG. 13A has been carried out, the authorization procedure represented by the flow chart of FIG. 13B is executed whenever the applications program is to be run. As an example, after the floppy disk which contains the applications program has recorded thereon the signature of the authorized computer system, subsequent attempts to install, or load that applications program result in executing the authorization procedure shown in FIG. 13B. Initially, the authorization procedure inquires, at 1314, if a signature has been stored on the floppy disk. If this inquiry is answered in the negative, for example, if the set up procedure shown in FIG. 13A has not been carried out, an error message is displayed, as represented by instruction 1316. This message may indicate that the computer system on which the applications program is intended to be run is not an authorized computer system.

However, if inquiry 1314 is answered in the affirmative, then the signature of the computer system with which the applications program is intended to be run is measured, as indicated by instruction 1318. Then, the authorization procedure advances to inquiry 1320 to check if the stored signature and the measured signature are the same. If this inquiry is answered in the affirmative, only then may the applications program be executed, as represented by instruction 1322. However, if inquiry 1320 is answered in the negative, a suitable error message is displayed, as represented by instruction 1324. For example, a message may be displayed stating that the computer system on which the applications program is intended to be run is not an authorized computer system.

The flow chart shown in FIG. 14 is similar to the flow charts shown in FIGS. 13A and 13B and essentially combines the set up procedure and the authorization procedure into a single so-called "copy protection" procedure. The copy protection procedure inquires initially at 1402 if a signature has been stored previously on the floppy disk. If this inquiry is answered in the affirmative, then the signature of the computer system with which the applications program is intended to be run is measured. If the measured signature is the same as the previously determined and stored signature, inquiry 1412 is answered in the affirmative and the applications program is executed, as represented by instruction 1408. However, if inquiry 1412 is answered in the negative, an error message is displayed, thereby indicating that an attempt has been made to run the applications program on an unauthorized computer system. It is appreciated that, under this condition, the applications program cannot be executed.

If inquiry 1402 had been answered in the negative, that is, if the signature of a computer system had not yet been measured and stored, the copy protection procedure advances to instruction 1404 whereat the signature of the computer system into which the applications program is to be installed is measured. Then, the copy protection procedure advances to instruction 1406 whereat the measured signature is stored in software. That is, the values of the various components of the measured signature are recorded on the floppy disk. Thereafter, the applications program is executed, as represented by instruction 1408.

Thus, in the embodiment shown in FIG. 14, if the signature of a computer system had not yet been determined, the particular computer system into which the applications program is installed is measured, and it is assumed that this computer system merely is the authorized computer system. Hence, once the signature of that computer system has been measured and stored, that computer system is permitted to execute the applications program. However, for all subsequent attempts to execute this program, the signature of the particular computer system which is intended to be used with that program first is measured and then compared to the previously stored signature. If the signatures do not match, the applications program is not run.

Authorized Hardware Changes

Those of ordinary skill in the art will recognize that the user of a computer system, whether an individual user of a so-called "stand alone" system or a network user in an environment of several computer systems interconnected in a network arrangement, may wish to upgrade his system to incorporate therein advances and improvements which become commercially available. Typically, these advances and improvements (referred to generally as upgrades) relate to various hardware components, such as a change in the processor, a change in the operating system for that processor (as represented by a change in the ROM) or a change in the disk drive. A change in the processor may be occasioned by, for example, the addition of a co-processor to the computer system which, currently, is achieved by the addition of a "turbo" board thereto. A change in the ROM may be occasioned by an updated ROM BIOS. A change in the disk drive may be occasioned by a new floppy disk drive or the addition to the computer system of a rigid disk drive, such as a Winchester drive.

Figure 15:
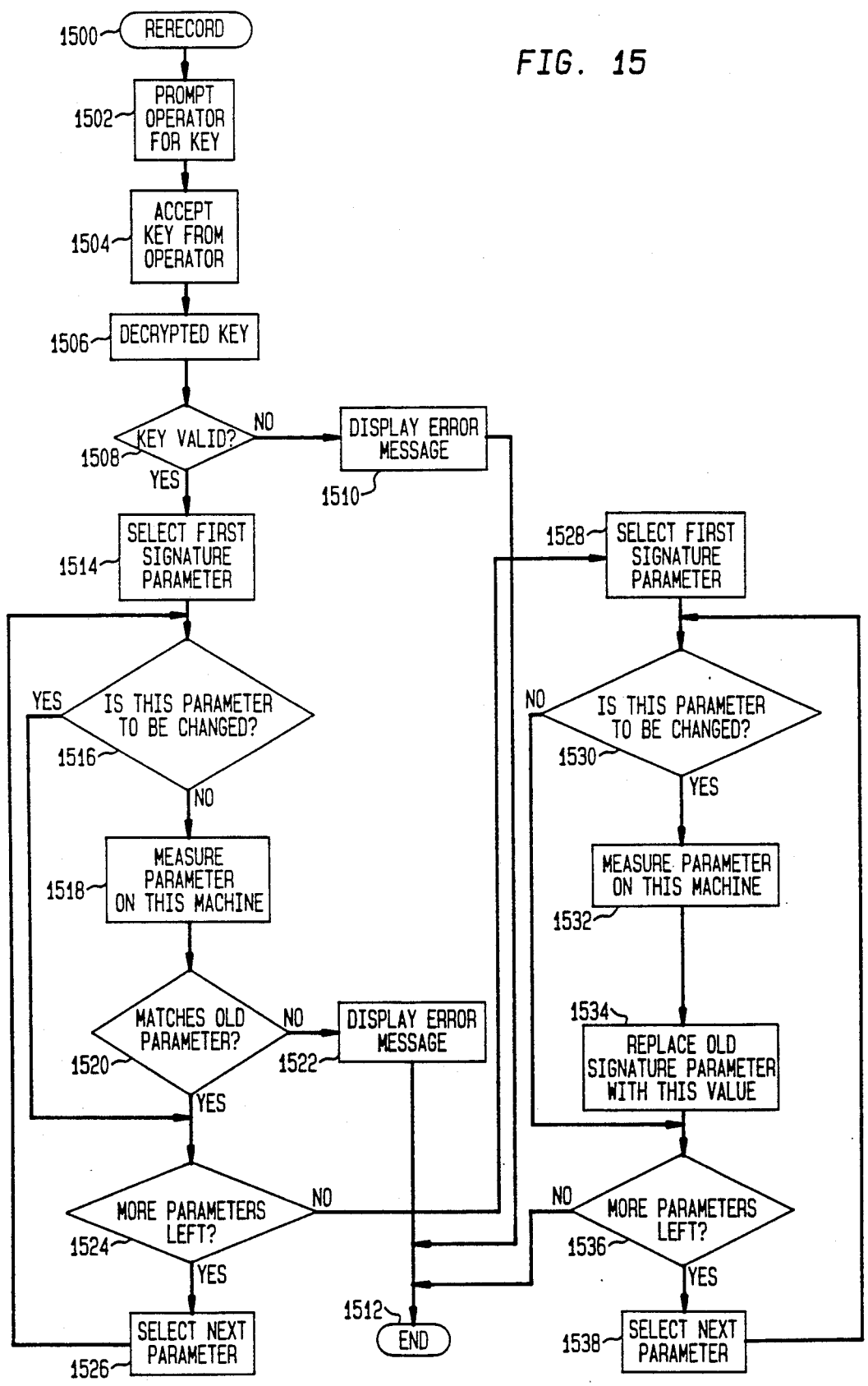
FIG. 15 is a flow chart representing the manner in which the present invention is adapted to accommodate changes in parametric characteristics which accompany changes in hardware components of an authorized computer system.

It is appreciated that such changes in hardware will result in a change in one or more parametric characteristics which constitute the signature of the computer system. As a result, even though the user of the computer system may be authorized to use an applications program, the particular signature which is stored in this applications program, and which is based upon the original configuration of the computer system, will not match the new signature which results from the changed parametric characteristics. FIG. 15 is a flow chart which enables an authorized user to update the signature of his computer system to accommodate such hardware changes.

It is contemplated that an update in the signature is effected by a "re-recording" of that signature in the applications program. This re-recording operation will be carried out both for stand alone computer systems and a network of computer systems. In either case, an initial "screening" occurs to verify the authorization of the user, or operator, to re-record the computer system signature. In one embodiment, this verification is carried out by entering an encrypted key code, or password, into the computer system, this encrypted key being compared to one which has been stored previously in anticipation of possible signature recordings. The key entered by the operator may be provided by, for example, an authorized source, such as the manufacturer or distributor of the applications program who, in turn, provides this key (typically, in the form of key strokes) after confirming that the operator has made a legitimate hardware change which necessitates a signature re-recording. For example, the operator may confer with the manufacturer's representative, as by telephone, and receive from him the necessary key strokes which constitute the password. In this embodiment, the stored encrypted key to which the password is compared, or the decryption routine necessary to identify the password, may be programmed to change once a signature has been re-recorded. This would prevent the operator from effecting signature re-recording in the future based upon the previously ascertained password.

As another embodiment, if the computer system includes a modem, a telephone communications link may be established between the computer system and the manufacturer/distributor of the application program, whereupon the necessary key may be downloaded directly from the manufacturer/distributor to the computer system. Various other techniques known to those of ordinary skill in the art may be used to provide the operator with the password need to initiate a signature re-record operation. It also is contemplated that the applications program, if contained on a floppy disk, must be returned to the manufacturer/distributor and replaced with a new applications program which, to be implemented on the computer system, first must be furnished with those parametric characteristics which have been changed.

Regardless of the particular procedure used to furnish the operator with the necessary password, the signature update routine illustrated by the flow chart in FIG. 15 is carried out to re-record those parametric characteristics which have been changed. In carrying out this routine, the operator of the computer system first is prompted, as represented by instruction 1502, to enter the encryption key (or password) needed to "unlock" the re-record operation. The key not only unlocks the re-record operation, but also identifies those parametric characteristics which have been changed. For example, if the disk drive has been updated, the key identifies those characteristics associated with the disk drive which have been changed, e. g. disk rotation speed, head stepping speed or disk interleave value. Of course, all other parametric characteristics included in the signature are expected to be unchanged.

The operator responds to prompt 1502 to enter the key, and this entered key initially is accepted by the computer system, as represented by instruction 1504. The key is decrypted, as at 1506, and inquiry 1508 then is made to determine if this key is valid, or authorized. If this key is not valid, thus representing an unauthorized attempt to update the signature stored in the applications program, inquiry 1508 is answered in the negative, an error message is displayed (instruction 1510) and the signature re-record procedure ends.

However, if the key entered into the computer system is valid, inquiry 1508 is answered in the affirmative and the re-record procedure advances to select the first of the parametric characteristics which constitute the signature, as represented by instruction 1514. Inquiry 1516 then is made to determine if this is one of the parametric characteristics that have been changed. If not, the routine advances to instruction 1518 to measure this particular parametric characteristic, as exhibited by the computer system. Then, inquiry 1520 is made to determine if the measured parametric characteristic, i. e., the characteristic which has not been changed, is the same as that which is stored in the applications program.

If inquiry 1520 is answered in the negative, an error message is displayed, as at 1522, indicating that a characteristic which was not changed does not match the previous measurement of that characteristic. Since all of the parametric characteristics which are not changed must exhibit the same values which had been measured during the initial signature setup procedure, a negative answer of inquiry 1520 assumes that the computer system on which this applications program is intended to be run is not authorized.

However, if inquiry 1520 is answered in the affirmative, that is, if the value of a parametric characteristic which is not changed is the same as that which was measured during the initial signature setup procedure, the routine advances to inquiry 1524. This inquiry determines whether the signature of the computer system contains further parametric characteristics which must be checked. If inquiry 1524 is answered in the affirmative, the next parametric characteristic included in the signature is selected, as represented by instruction 1526, and inquiry 1516 is repeated.

The illustrated routine cycles through the loop formed of inquiry 1516, instruction 1518, inquiries 1520 and 1524, and instruction 1526 to confirm that those parametric characteristics which are not changed retain their previously measured values. When a characteristic which has been changed is selected, inquiry 1516 is answered in the affirmative, and this characteristic is not measured. The routine merely advances to inquiry 1524 and continues to cycle through the illustrated loop.

After the last parametric characteristic contained in the signature has been selected and either measured (if this characteristic has not been changed) or not (if this characteristic has been changed), inquiry 1524, when reached, is answered in the negative. The re-record routine then advances to instruction 1528, whereat the first parametric characteristic contained in the signature (whether or not it is to be re-recorded) is selected. Inquiry 1530 then is made to determine if this characteristic is to be changed. If not, the routine advances to inquiry 1536 to determine if further characteristics are contained in the signature. If so, instruction 1538 is carried out to select the next characteristic, and the routine continues to cycle through the loop formed of inquiries 1530 and 1536 and instruction 1538 until a characteristic is reached which has been changed.

When a changed characteristic is selected, inquiry 1530 is answered in the affirmative, and the re-record routine advances to instruction 1532. As indicated in the flow chart, this changed parametric characteristic of the computer system is measured, and this new measurement replaces the previous measurement so as to properly update the signature. The new value of the parametric characteristic preferably is stored in the applications program, as discussed above. Then, inquiry 1536 is made once again.

From the foregoing description, it is recognized that those parametric characteristics which have not changed are not altered; but those characteristics which have been changed are remeasured and re-recorded. Thus, the signature of this computer system is updated to accommodate any hardware changes which may have been made. After all of the parametric characteristics have been selected, inquiry 1536 is answered in the negative and the re-record routine terminates.

Thereafter, whenever the applications program is to be executed by the upgraded computer system, the re-recorded signature is used to confirm that the computer system which intends to operate the applications program is authorized.

Network Authorization/Applications Program

It is recognized that the present invention may be used in the environment of a network of computer systems. Typically, a single source (or relatively few sources) of an applications program is provided in a network environment, and any authorized user in that network may gain access to the source to execute the applications program. For example, the applications program may be stored on one rigid disk drive which may be accessed by members of the network to transfer the applications program from that disk drive to the accessing computer system. Once transferred, the applications program typically is resident in the computer system memory; although the transferred program alternatively may be stored on a floppy disk or rigid disk associated with that computer system.

The applications program used in the network environment may be provided with the signatures of those computer systems that are authorized to execute the program. The signatures of, for example, n computer systems may be measured and recorded on the applications program, and when one of those n computer systems attempts to execute the program, the signature of that computer system is compared to the stored list of signatures to verify authorization. If the computer system seeking to execute the applications program is not one of the n authorized users, access is denied. When the present invention is used in the network environment, the setup procedure by which the signatures of the n computer systems is recorded may be executed only with predetermined authorization, such as by an authorized network supervisor. It is assumed, for the purpose of discussion, that the setup procedure represented by the flow chart shown in FIG. 16A may be executed only by such an authorized network supervisor.

Figure 16A:
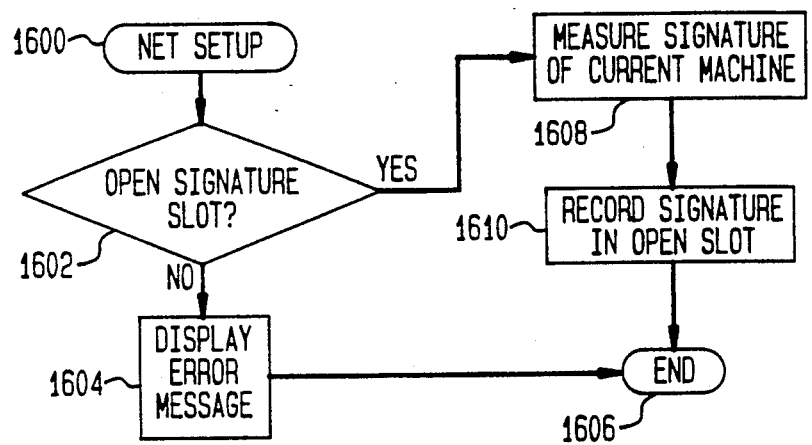
FIGS. 16A and 16B are flow charts representing the manner in which the present invention may be utilized in a network environment.

FIG. 16A is quite similar to the flow chart shown in FIG. 13A, except that the initial inquiry 1602 in FIG. 16A determines whether one of the n "signature slots" is empty. As used herein, a signature slot is an available location in the applications software at which a signature may be recorded.

In view of the similarity of the flow chart shown in FIG. 16A with that described previously in FIG. 13A, the operation of the FIG. 16A flow chart need be only briefly described. In carrying out the network setup procedure, inquiry 1602 determines if a signature slot in the applications software is available for the addition of a new signature. If this inquiry is answered in the negative, the setup procedure terminates and a suitable error message is displayed, as represented by instruction 1604. Hence, a new signature cannot be added to the software.

However, if inquiry 1602 is answered in the affirmative, the signature of this particular one of the n computer systems is measured, as represented by instruction 1608. After the signature of this computer system has been measured, it is recorded, or stored, in the open signature slot in the software integrated with the applications program.

If the network supervisor wishes to record additional signatures of other computer systems included in the network, and if there exists additional open signature slots in the software, the procedure represented by the flow chart of FIG. 16A may be re-executed.

Figure 16B:
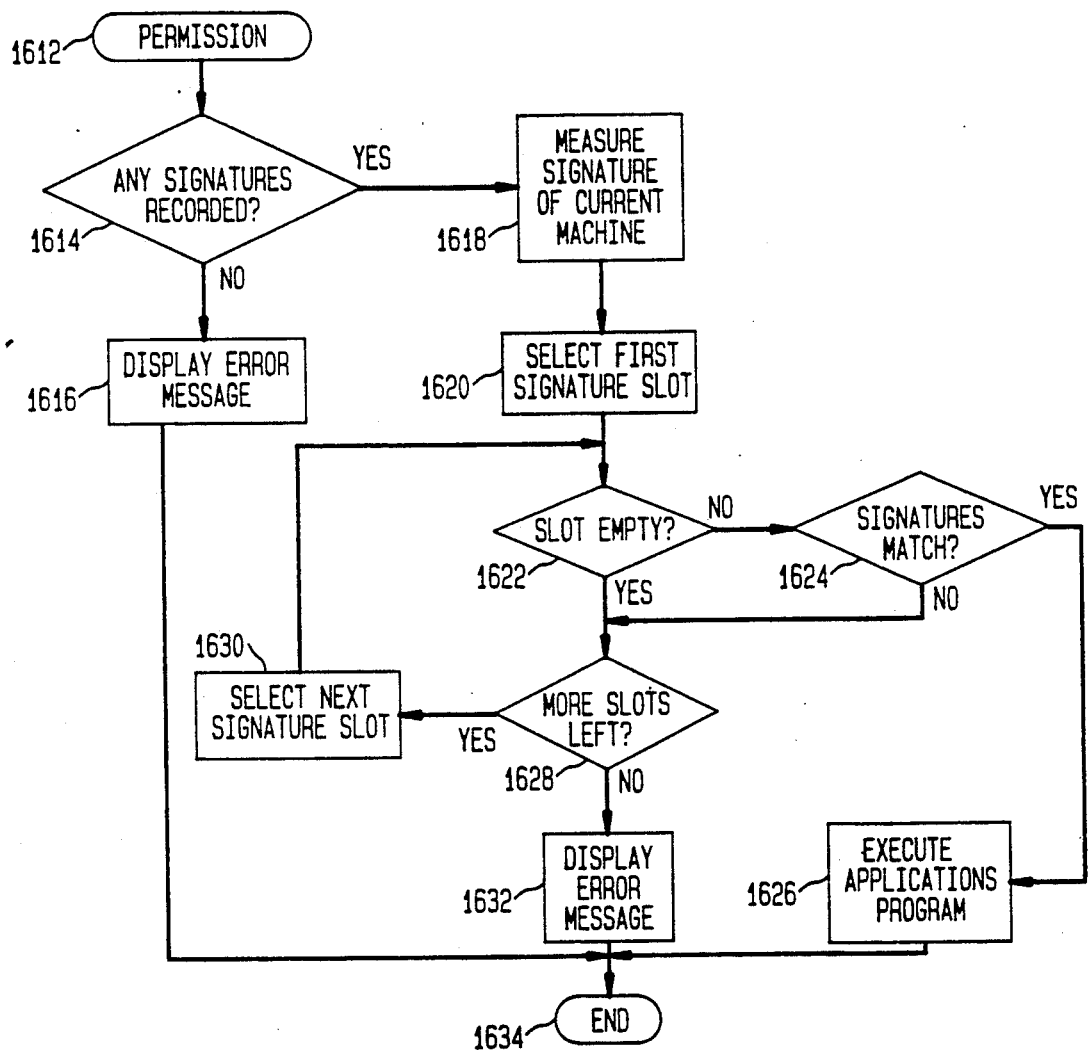

FIG. 16B illustrates a flow chart representing the authorization procedure which is executed whenever the applications program is to be run on one of the computer systems included in the network. It is assumed that this authorization procedure is embodied in the software integrated with the applications program. Initially, the authorization procedure inquires, at 1614, if any signatures have been recorded in the signature slots made available in the software. If this inquiry is answered in the negative, for example, if the setup procedure shown in FIG. 16A has not been carried out for any computer system, an error message is displayed, as represented by instruction 1616, and the authorization routine terminates. The applications program is not run because the authorization software has concluded that the computer system which intends to run the applications program is not authorized to do so.

However, if inquiry 1614 is answered in the affirmative, then the signature of the computer system which seeks to execute the applications program is measured, as indicated by instruction 1618. Then, the first signature slot in the software is selected, as at 1620, and inquiry 1622 is made to determine if this first signature slot is empty. If not, the signature stored in this slot is compared to the signature measured from this computer system. Inquiry 1624 is made to determine if the compared signatures match.

If inquiry 1624 is answered in the affirmative, the applications program may be executed, as represented by instruction 1626. However, if inquiry 1624 is answered in the negative, the authorization routine advances to inquiry 1628 to determine if other signature slots remain to be tested.

If inquiry 1628 is answered in the affirmative, the next signature slot is selected as represented by instruction 1630, and inquiry 1622 is repeated to determine if this next-selected slot is empty. It is recognized that the authorization routine cycles through the loop formed of inquiries 1622, 1624 and 1628 and instruction 1630 until a signature stored in a slot matches the signature measured from the computer system which is seeking to run the applications program. A matched signature is, of course, indicative of the authorization of this computer system; thus enabling that system to run the applications program. However, if this computer system is not authorized to execute the applications program, the authorization routine continues to cycle through the aforementioned loop until the last signature slot is selected. If that last slot is empty, or if the signature stored therein does not match the signature measured from the computer system, inquiry 1628 is answered in the negative. Then, a suitable error message is displayed, as represented by instruction 1632. For example, a message may be displayed stating that the computer system which seeks to execute the applications program is not an authorized computer system.

While the present invention has been particularly shown and described with reference to certain preferred embodiments, it will be readily appreciated by those of ordinary skill in the art that various changes and modifications may be made without departing from the spirit and scope of the invention. For example, the various subroutines, as well as the applications program whose copying is intended to be protected by these subroutines, may be in the form of a floppy disk, a magnetic tape, a ROM cartridge, a CD ROM, or the like. As mentioned previously, such devices which present software to a computer system are known generally as mass memory devices. The particular type of mass memory device that may be used with the present invention is not critical and forms no part of the invention per se.

As mentioned above, it is contemplated that the present invention may be used in a network of data processing devices wherein an applications software program stored on, for example, a hard disk in that network may be accessed by any of the networked data processing devices. The signature of the n authorized data processing devices (n=1, 2, 3, ... or any integer preferably less than all of the networked data processing devices) is stored and compared to the signature of the data processing device that attempts to run the applications program. The manner in which the signatures are measured, stored and compared has been described above.

In describing the various subroutines that are executed in accordance with the present invention, a particular sequence of steps has been described. However, those of ordinary skill in the art will recognize that this sequence need not be followed precisely. Various steps may be executed in different order without departing from the present invention. For example, in the flow chart of FIG. 3, a 16-bit exchange operation is carried out before an 8-bit exchange operation is executed. It is appreciated that the 8-bit exchange operation may be performed first. Similarly, in the clock speed subroutine shown in FIG. 5, a 1-stage shift operation is carried out before an 8-bit shift operation. The order in which these operations are executed may be reversed. Without describing other examples, it will be appreciated that the sequential steps which have been discussed above are merely preferred but are not prerequisite to carrying out the present invention.

Accordingly, it is intended that the appended claims be interpreted as including equivalents to the invention described herein.

What is claimed is:

1. A system for reducing unauthorized use by data processing apparatus of a software program having, as a portion thereof, predetermined values of selected inherent, system independent characteristics of authorized data processing apparatus, said system comprising:
    means for determining actual values of said selected characteristics for operating data processing apparatus attempting to run said software program;
    means, response to said means for determining, for comparing said determined actual values with said predetermined values;
    means, responsive to said means for comparing, for selectively running said software program;
    wherein said data processing apparatus includes a read only memory (ROM), and said predetermined values include an identification value for said ROM, and said identification value for said ROM comprises a cyclic redundancy check (CRC) value of contents of said ROM; and wherein said data processing apparatus includes a processor having at least one register, and wherein said means for determining further comprises:

means for multiplying a value contained in said register by a first constant (C);

addressing means for addressing successive locations of said ROM;

means, responsive to said successive locations, for then successively adding to said register values contained in said successive locations;

means for then dividing said values contained in said register by a second constant (D) to produce a quotient and a remainder value;

and means for loading said register with said remainder value, whereby said register then contains said CRC value.

2. The system of claim 1 wherein said data processing apparatus includes a random access memory (RAM) whose read/write speed may be less than an operator speed of said processor, and said predetermined values include a wait time assigned to said processor for accessing said RAM.

3. The system of claim 2 wherein said means for determining comprises ROM timing means for measuring the amount of time for accessing a location of said ROM; RAM timing means for measuring the amount of time for accessing a location of said RAM and means, responsive to said ROM and RAM timing means, for determining a difference between said measured amounts of time.

4. The system of claim 3 wherein each of said ROM and RAM timing means comprises means for reading an addressable location a predetermined number of times.

5. The system of claim 4 wherein said means for determining said difference between said measured amounts of time includes means for dividing said difference by said predetermined number to produce a quotient representing said wait time.

6. The system of claim 5 further comprising deriving means, responsive to said means for determining a difference between said measured amounts of time, for deriving from said wait time a representation of a number of wait states assigned to said processor.

7. The system of claim 6 wherein said data processing apparatus attempting to run said software program includes a clock generator; and wherein said deriving means comprises means for determining a clock period for said clock generator, and means for dividing said wait time by said clock period.

8. A system for reducing unauthorized use by data processing apparatus of a software program having, as a portion thereof, predetermined values of selected inherent, system independent characteristics of authorized data processing apparatus, said system comprising:

means for determining actual values of said selected characteristics data for data processing apparatus attempting to run said software program;

means, responsive to said means for determining, for comparing said determined actual values with said predetermined values;

means, responsive to said means for comparing, for selectively running said software program;

wherein said means for determining comprises access timing means for determining a time for the read/write head to access a predetermined number of tracks, and wherein said access timing means further comprises:

read means for reading a predetermined sector from a particular track on the disk of said disk drive;

head moving means, responsive to said read means, for then causing said read/write head to move forward and backward across a number of tracks on said disk to return to said particular track;

re-read means, responsive to said head moving means, for then re-reading said predetermined sector;

re-read timing means, responsive to said head moving and re-read means, for obtaining a time between return of said rad/write head to said particular track and re-reading of said predetermined sector; and means, responsive to said re-read means and said disk;

for obtaining a difference between a time for said disk to complete a rotation and said obtained time.

9. The system of claim 8 wherein said predetermined number of tracks accessed by said read/write head comprises one track.

10. The system of claim 9 further comprising additional means for measuring the time for said disk to make m complete rotations; and wherein said re-read timing means comprises delay adding means for adding a preset time delay between the time that said read/write head returns to said particular track and the time that said predetermined sector is re-read, total timing means for measuring the total time, including said time delay, for said read/write head to re-read said predetermined sector, incrementing means, responsive to said determining means, for incrementally increasing said time delay until said total time is greater than the time for said disk to make m complete rotations, and means for dividing by twice the number of tracks across which said read/write head is moved the difference between the time for said disk to make m complete rotations and said incrementally increased time delay.

11. A system for reducing unauthorized use by data processing apparatus of a software program having, as a portion thereof, predetermined values of selected inherent, system independent characteristic of authorized data processing apparatus, said system comprising:

means for determining actual values of said selected characteristics for data processing apparatus attempting to run said software program;

means, responsive to said means for determining, for comparing said determined actual values with said predetermined values;

means, responsive to said means for comparing, for selectively running said software program;

wherein said data processing apparatus includes a disk drive, and said predetermined values include a rotary speed value for said disk drive: and wherein said means for determining further comprises:

reading means for reading a predetermined sector from said disk drive at least twice in succession; and means, responsive to said reading means, for measuring elapsed time between successive reading operations.

12. The system of claim 11 wherein said predetermined sector is read M successive times and a time elapsed to carry out M read operations is measured; and further comprising means, responsive to said reading means, for dividing said measured time elapsed by M.

13. A system for reducing unauthorized use by data processing apparatus of a software program having, as a portion thereof, predetermined values of selected inherent, system independent characteristics of authorized data processing apparatus, said system comprising:
 means for determining actual values of said selected characteristics for operating data processing apparatus attempting to run said software program;
 means, responsive to said means for determining, for comparing said determined actual values with said predetermined values;
 means, responsive to said means for comparing, for selectively running said software program;
 wherein said operating data processing apparatus includes:
 a clock generator and said predetermined values includes a clock speed value for said clock generator;
 a processor having at least one register, and wherein said means for determining comprises shifting means for shifting said register in responsive to clock pulses generated by said clock generator;
 timing means, responsive to said shifting means, for measuring an amount of time for shifting said register; and
 means, responsive to said timing means, for determining from said measured amount of time a clock speed for said clock generator; and wherein said means for determining said clock speed of said clock generator further comprises:
 indicating means for providing an indication of a number of clock pulses used by said processor to shift said register; and
 means, responsive to said indicating means, for dividing said measured amount of time by said indication to provide a value of a clock pulse period.

14. The system of claim 13 wherein said shifting means comprises A shifting means for shifting said register by a first preset number (A) a predetermined number of times, and B shifting means for shifting said register by a second preset number (B) said predetermined number of times.

15. The system of claim 14 wherein said timing means comprises A timing means for measuring a time elapsed ($T_1$) for said register to be shifted by A said predetermined number of times; B timing means for measuring a time elapsed ($T_2$) for said register to be shifted by B said predetermined number of times; means, responsive to said A and B timing means, for determining a difference in said elapsed times ($T_1$ and $T_2$); and means for dividing said difference in said elapsed times ($T_2 - T_1$) by said predetermined number and by a difference between said preset numbers (B-A) to obtain a measure of an amount of time for shifting said register by one.

16. A system for reducing unauthorized use by data processing apparatus of a software program having, as a portion thereof, predetermined values of selected, inherent, system independent characteristics of authorized data processing apparatus, said system comprising:
 means for determining actual values of said selected characteristics for operating data processing apparatus attempting to run said software program;
 means, responsive to said means for determining for comparing said determined actual values with said predetermined values;
 means, responsive to said means for comparing, for selectively running said software program;
 wherein said data processing apparatus includes:
 a processor; and said predetermined values include an identification value for said processor;
 a data bus coupled to said processor, and said identification value for said processor includes a predetermined size value for said data bus; and
 a memory device coupled to said data bus; and wherein said means for determining further comprises:
 first exchanging means for exchanging an n-bit data character between said processor and said memory device a predetermined number of times;
 first measuring means for measuring a first time duration for said predetermined number of times n-bit characters are exchanged;
 second exchanging means for exchanging a 2n-bit data character between said processor and said memory device said predetermined number of times;
 second measuring means for measuring a second time duration for said predetermined number of times 2n-bit characters are exchanged; and
 means for determining that said data bus is 2n-bit wide if said first and second measured time durations are substantially equal and for determining that said data bus is n-bits wide if said first and second measured time durations are not substantially equal.

17. A system for reducing unauthorized use by data processing apparatus of a software program having, as a portion thereof, predetermined values of selected inherent, system independent characteristics of authorized data processing apparatus, said system comprising:
 means for determining actual values of said selected characteristics for data processing apparatus attempting to run said software program;
 means, responsive to said means for determining, for comparing said determined actual values with said predetermined values;
 means, responsive to said means for comparing, for selectively running said software program;
 wherein said data processing apparatus attempting to run said software program includes a disk drive having a disk and a read/write head for reading/writing data in interleaved sectors; and said predetermined values include a sector interleave value;
 wherein said sector interleave value is a measure of the number of sectors which separate logically sequential sectors on said disk: and wherein said means for determining further comprises:
 rotation timing means for measuring a time for accessing a logical first sector and a logical M-th sector, wherein m is an integer preset to the value "2";
 access timing means, response to said accessing means, for measuring a time to access the logical M-th sector;
 M determining means, responsive to said rotation timing and said access timing means, for determining if the difference between said time for said disk to make one complete rotation and said time to access the logical M-th sector is equal to said time for one complete sector to rotate past said head;
 M incrementing means, responsive to said M determining means, for incrementing the value of M until said difference is equal to said time for one complete sector to rotate past said head;
 and means, responsive to said M incrementing means, for determining said interleave value as a function of M.

* * * * *